| (12) United States Patent | (10) Patent No.: US 7,640,516 B2 |
| Atkins | (45) Date of Patent: Dec. 29, 2009 |

(54) ARRANGING GRAPHIC OBJECTS ON PAGES

(75) Inventor: C. Brian Atkins, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 712 days.

(21) Appl. No.: 11/364,933

(22) Filed: Mar. 1, 2006

(65) Prior Publication Data

US 2006/0150092 A1    Jul. 6, 2006

Related U.S. Application Data

(63) Continuation-in-part of application No. 11/127,326, filed on May 12, 2005, and a continuation-in-part of application No. 11/128,543, filed on May 13, 2005, and a continuation-in-part of application No. 10/675,724, filed on Sep. 30, 2003, and a continuation-in-part of application No. 10/675,823, filed on Sep. 30, 2003.

(51) Int. Cl.
*G06F 3/00* (2006.01)
*G06F 3/048* (2006.01)

(52) U.S. Cl. .................. 715/853; 715/713; 715/841

(58) Field of Classification Search ............... 715/713, 715/719–726, 853–854; 707/100
See application file for complete search history.

(56) References Cited

U.S. PATENT DOCUMENTS

| 6,301,586 | B1 | 10/2001 | Yang et al. | |
| 6,636,648 | B2 | 10/2003 | Loui et al. | |
| 6,636,650 | B1 | 10/2003 | Long et al. | |
| 6,771,801 | B1 | 8/2004 | Fisher et al. | |
| 6,983,420 | B1 * | 1/2006 | Itou et al. | 715/723 |
| 7,149,755 | B2 * | 12/2006 | Obrador | 715/723 |
| 2002/0070982 | A1 | 6/2002 | Hill et al. | |
| 2002/0122067 | A1 | 9/2002 | Geigel et al. | |
| 2003/0001879 | A1 | 1/2003 | Lin et al. | |
| 2004/0019608 | A1 * | 1/2004 | Obrador | 707/104.1 |
| 2005/0071781 | A1 | 3/2005 | Atkins | |

(Continued)

OTHER PUBLICATIONS

Joe Geigel et al., "Automatic page layout using genetic algorithms for electronic albuming," Proceedings of Electronic Imaging 2001 (Jan. 2001) available on-line at http://www.

(Continued)

*Primary Examiner*—Weilun Lo
*Assistant Examiner*—Truc T Chuong

(57) ABSTRACT

Candidate tree structures, each of which includes a current tree structure and a respective node defining a respective relative location on the selected page for another graphic object selected from a set, are generated. Initial size dimensions are determined for the graphic objects in each of the candidate tree structures. Respective scores are computed for the candidate tree structures based at least in part on the corresponding initial size dimensions. One of the candidate tree structures is selected as the current tree structure based on the computed scores. The process is repeated until relative locations on the page are defined for all of the graphic objects in the set. Next, final size dimensions are calculated for the graphic objects in accordance with the current tree structure. Respective positions of the graphic objects on the selected page are specified in accordance with the current tree structure.

26 Claims, 26 Drawing Sheets

U.S. PATENT DOCUMENTS

2005/0071783 A1  3/2005  Atkins

OTHER PUBLICATIONS

Eldan Goldenberg, "Automatic layout of variable-content print data," MCs Dissertation, School of Cognitive & Computing Sciences, Univeristy of Sussex, Brighton, UK (2002).

D.F. Wong et al., "A new algorithm for floorplan design," Proc. Design Automation Conference, pp. 101-107, 1986.

Atkins, B.C, "Adaptive photo collection page layout," Image Processing, 2004. ICIP '04. 2004 International Conference onvol. 5, Oct. 24-27, 2004 pp. 2897-2900.

* cited by examiner

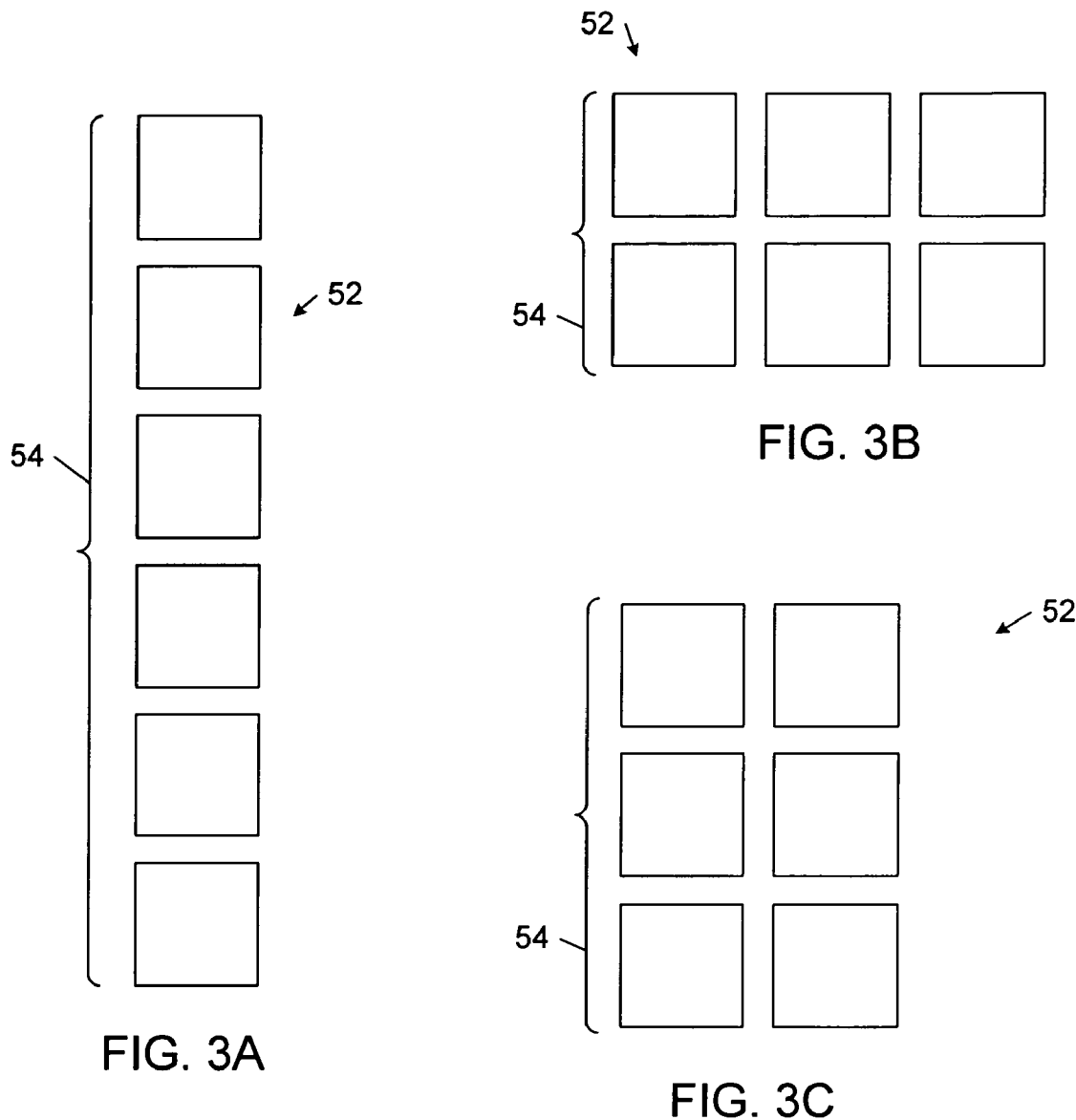
FIG. 3B
FIG. 3A
FIG. 3C
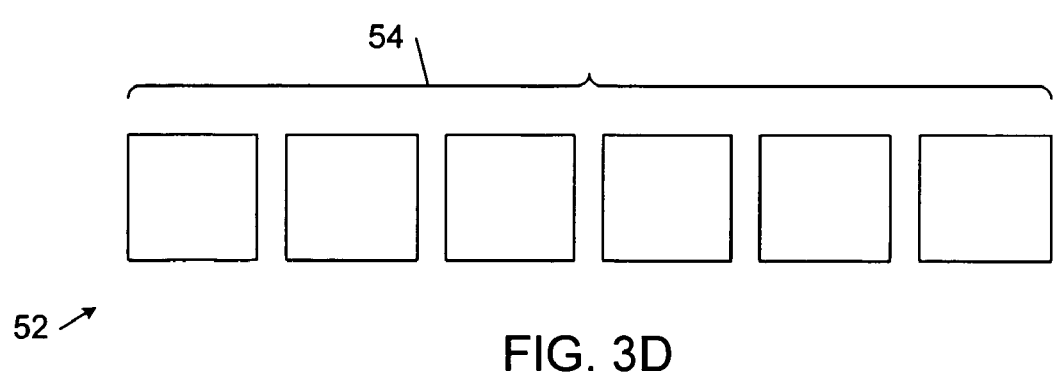
FIG. 3D

ARRANGING GRAPHIC OBJECTS ON PAGES

CROSS-REFERENCE TO RELATED APPLICATIONS

This application is a continuation-in-part of each of the following co-pending applications, claims the benefit of each of the following co-pending applications under 35 U.S.C. § 120, and incorporates each of the following co-pending applications herein by reference:

U.S. patent application Ser. No. 10/675,724, filed Sep. 30, 2003, by C. Brian Atkins and entitled "Automatic Photo Album Layout";

U.S. patent application Ser. No. 10/675,823, filed Sep. 30, 2003, by C. Brian Atkins and entitled "Single Pass Automatic Photo Album Layout";

U.S. patent application Ser. No. 11/127,326, filed May 12, 2005, by C. Brian Atkins and entitled "Method for Arranging Graphic Assemblies";

U.S. patent application Ser. No. 11/128,543, filed May 13, 2005, by C. Brian Atkins and entitled "Method for Arranging Graphic Assemblies";

This application also relates to the following co-pending applications, each of which is incorporated herein by reference:

U.S. patent application Ser. No. 10/831,436, filed Apr. 23, 2004, by C. Brian Atkins et al. and entitled "Method for Assigning Graphical Images to Pages";

U.S. patent application Ser. No. 11/126,637, filed Apr. 15, 2005, by Xiaofan Lin et al. and entitled "Automatic Layout Generation for Documents Containing Text";

U.S. patent application Ser. No. 11/151,167, filed Jun. 10, 2005, by C. Brian Atkins et al. and entitled "Constraint-Based Albuming Of Graphic objects";

U.S. patent application Ser. No. 11/069,512, filed Mar. 1, 2005, by C. Brian Atkins and entitled "Arranging Images on Pages of an Album"; and U.S. patent application Ser. No. 10/987,288, filed Nov. 12, 2004, by C. Brian Atkins and entitled "Albuming Images".

BACKGROUND

Individuals and organizations are rapidly accumulating large collections of digital image content, including still images, text, graphics, animated graphics, and full-motion video images. This content may be presented individually or combined in a wide variety of different forms, including documents, catalogs, presentations, still photographs, commercial videos, home movies, and meta data describing one or more associated digital content files. As these collections grow in number and diversity, individuals and organizations increasingly will require systems and methods for organizing and presenting the digital content in their collections. To meet this need, a variety of different systems and methods for organizing and presenting digital image content have been proposed.

For example, there are several manual digital image albuming systems that enable users to create digital photo albums manually. These systems typically provide tools for organizing a collection of images and laying out these images on one or more pages. Among the common types of tools for manually creating a digital photo album are tools for selecting a subset of images in the collection that will appear on a page of an album, a graphical user interface for manually rearranging the images on the page, and basic image editing tools for modifying various characteristics, such as size and orientation, of the images that will appear in the album. Users typically find the process of generating a digital photo album using fully manual digital image albuming systems to be tedious and time consuming.

Some automated digital image albuming systems allow users to organize digital images into album pages in accordance with dates and times specified in the metadata associated with the images. These systems also typically allow users to annotate the images appearing in the digital photo album pages. Some automated digital image albuming systems provide various predefined layout templates that a user may select to create a digital photo album. In these systems, the user assigns images from the collection to various predefined image locations on a selected layout template, and the system automatically adjusts the size, placement, rotation, and framing of the images in accordance with parameters specified for the various predefined image locations on the selected template.

What is needed are systems and method of arranging graphic objects on pages without predefined templates.

DESCRIPTION OF DRAWINGS

FIG. 3A-3D are diagrammatic views of four presentations of a multi-element graphic object formed from six constituent graphic objects.

DETAILED DESCRIPTION

Figure 1:
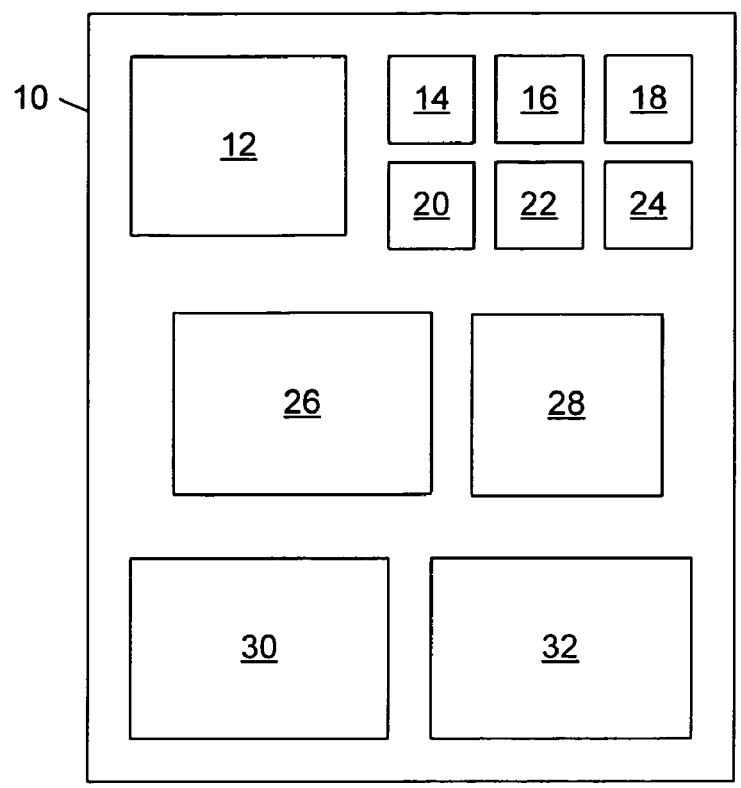
FIG. 1 is a diagrammatic view of a layout of graphic objects on a page.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale. Elements shown with dashed lines are optional elements in the illustrated embodiments incorporating such elements.

I. Introduction

The embodiments that are described in detail below provide ways to arrange graphic objects on one or more pages. These embodiments can create layouts of different types of graphic objects on a page to be created without using predefined templates, enabling the creation of new types of documents (e.g., collages and photo/video albums). These embodiments also enable graphic objects that are designated as being related to be kept together in page layouts, thereby preserving the context created by the physical proximity of such graphic objects.

As used herein, the term "page" refers to any type of discrete area in which graphic objects may be laid out, including a physical page embodied by a discrete physical medium (e.g., a piece of paper) on which a layout of graphic objects may be printed, and a virtual, digital or electronic page containing a layout of graphic objects that may be presented to a user by, for example, an electronic display device.

The term "graphic object" refers broadly to any type of visually perceptible content that may be rendered on a physical or virtual page, including images and text. Image-based graphic objects (or simply "images") may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

In some implementations, image-based graphic objects may be designated as fixed-area images or variable-area images. In these implementations, the areas or sizes of the fixed area images are not changed in the generated layouts, whereas the sizes of the variable-area images are permitted to change. Variable-area images may or may not have constraints associated with the relative areas of images rendered on the same page.

In the illustrated embodiments, each of the image-based graphic objects is assigned a respective aspect ratio. The aspect ratio is defined as the ratio of image height to image width.

Each variable-area image may further be assigned a respective positive scalar-valued relative area proportion (RAP). The relative area proportion assigned to a given image j is defined as the area $A_j$ of the rendered version of the given image j relative to the areas of the rendered versions of the other images appearing on the same page. Thus, for any two images j and k on the same page, the ratio of their relative area proportions RAP(j) and RAP(k) equals the ratio of rendered areas $A_j$ and $A_k$:

$$\frac{A_j}{A_k} = \frac{RAP(j)}{RAP(k)} \tag{1}$$

In some embodiments, the user is allowed to set the relative area proportion values that are assigned to the images. In other embodiments, the graphic object arrangement system automatically assigns the relative area proportion values to the images.

FIG. 1 shows an exemplary page 10 that includes multiple single-element graphic objects 12-32.

Figure 2:
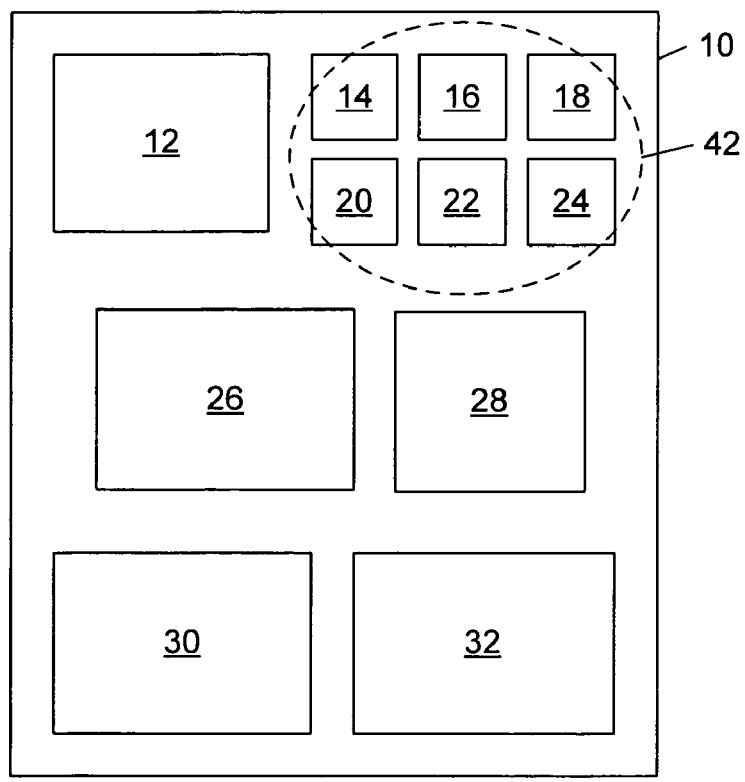
FIG. 2 is a diagrammatic view of the graphic object layout shown in FIG. 1 in which a multi-element graphic object that is formed from constituent single-element graphic objects is identified by a dashed ellipse.

As shown in FIG. 2, selected ones of the single-element graphic objects 12-32 may be grouped into a graphic object 42 whose constituent graphic objects (i.e., 14-24) are intended to appear near one another in a layout of the graphic objects on a page. As used herein, the term "graphic object" encompasses both a single-element graphic object and a multi-element graphic object formed from a cohesive group or collection of one or more graphic objects. The assignment of single-element graphic objects to a particular multi-element graphic object signifies that the constituent single-element graphic objects are related. In general, the type of single-element graphic objects in a multi-element graphic object may be the same or different. In the example shown in FIG. 2, the multi-element graphic object 42 may include different types of single-element graphic objects (e.g., image-based graphic objects and textual graphic objects). In addition, the single-element graphic objects of a multi-element graphic object may be arranged arbitrarily or in a specific ordered sequence (e.g., a temporally ordered sequence of keyframes of a video clip). A single-element graphic object that does not have a cohesive relationship with any other graphic object is a "degenerate" graphic object that has only one presentation.

As shown in FIGS. 3A-3D, a graphic object 52 having more than one constituent graphic object may be presented (or arranged) in more than one way. In some implementations, the presentations of single-element graphic objects in a multi-element graphic object are limited to horizontal and vertical arrangements of the graphic objects. In some of these implementations, the presentations may be further limited to certain preferred horizontal and vertical arrangements of the single-element graphic objects. For example, one implementation only permits presentations in which textual graphic objects appear only to the right of or below the images in the same multi-element graphic object. In this case, a graphic object 46 that includes an image and a text block may be presented in two different ways. FIGS. 3A-3D show that the graphic object 52, which includes a sequence 54 of six graphic objects (e.g., video keyframes), may be presented in the four different ways.

In general, graphic objects may be laid out on a page in accordance with a "strict area" style or a "brick" style. In a strict area style layout, the relative areas of graphic objects on the same page may meet pre-specified proportions. For example, a user may specify that all graphic objects on the same page have the same area. In a brick style layout, the relative areas of graphic objects on the same page are selected so that there is no empty space between images. Additional details regarding strict area style layouts and brick style layouts may be obtained from copending U.S. patent application Ser. No. 10/675,724, filed Sep. 30, 2004, and U.S. patent application Ser. No. 10/675,823, filed Sep. 30, 2004.

II. General Framework for Arranging Graphic Objects on Pages

Figure 4:
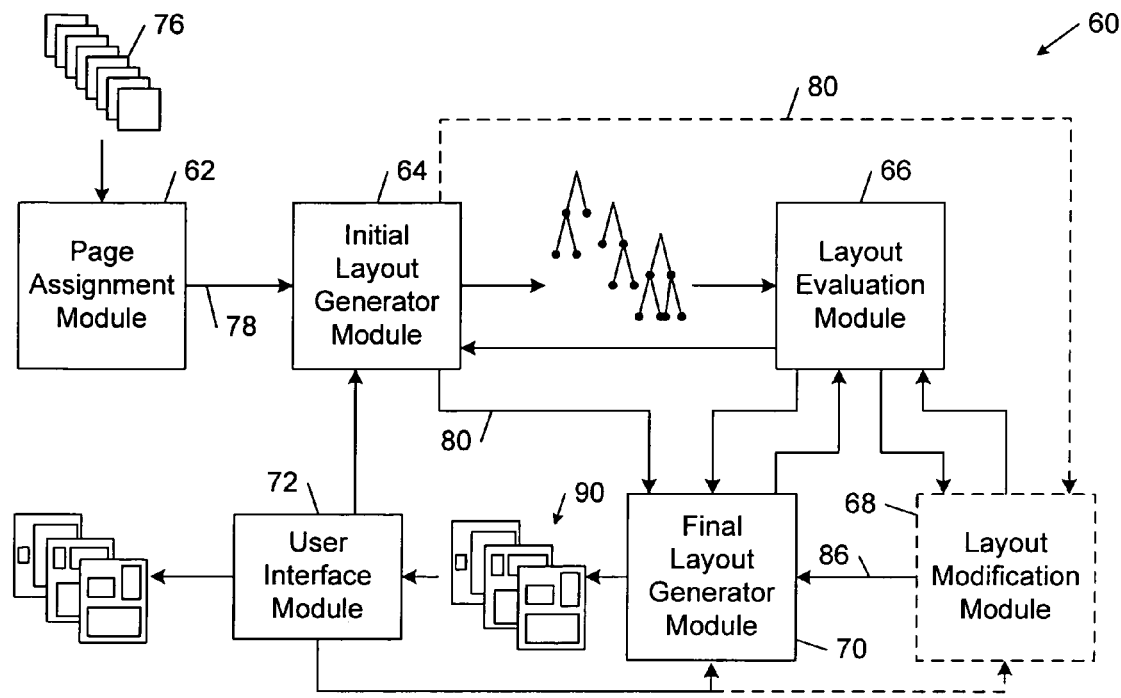
FIG. 4 is a block diagram of an embodiment of a graphic object arrangement system for arranging graphic objects on one or more pages.

FIG. 4 shows an embodiment of a graphic object arrangement system 60 that includes a page assignment module 62, an initial layout generator module 64, a layout evaluation module 66, an optional layout modification module 68, a final layout generator module 70, and a user interface module 72 through which a user interacts with the graphic object arrangement system 60. In general, the modules 62-72 of the graphic object arrangement system 60 are not limited to any particular hardware or software configuration, but rather they may be implemented in any computing or processing environment, including in digital electronic circuitry or in computer hardware, firmware, device driver, or software. For example, in some implementations, these modules may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

In some implementations, computer process instructions for implementing the modules 62-72 and the data generated by the modules 62-72 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROM.

Figure 5:
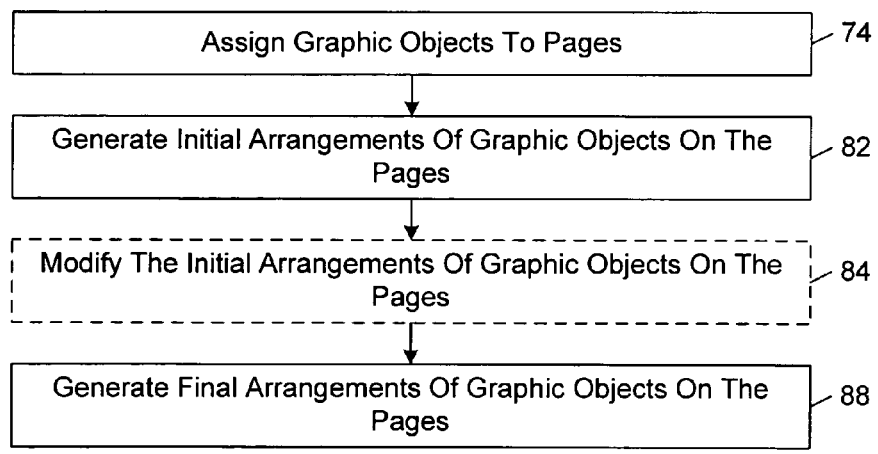
FIG. 5 is a flow diagram of an embodiment of a method of arranging graphic objects on pages.

FIG. 5 shows an embodiment of a method by which the initial layout generator module 64, the layout evaluation module 66, the layout modification module 68, and the final layout generator module 70 cooperatively generate a layout of graphic objects on one or more pages.

The page assignment module 62 assigns graphic objects to pages (FIG. 5, block 74). The page assignment module 62 operates on a collection of graphic objects 76, which may be designated by the user or may be identified automatically by the graphic object arrangement system 60. The page assignment module 62 assigns the graphic objects 76 to one or more pages using any one of a wide variety of page assignment methods. In some approaches, the page assignment module 62 assigns the graphic objects 76 to pages based on a page-filling criterion, such as a user-specified or default maximum number of graphic objects 76 that may be laid out on a page, or a user-specified or default fixed number of pages. In these approaches, the page assignment module 62 may assign the graphic objects 76 to pages in accordance with one or more arrangement criteria, such as a user-specified arrangement of graphic objects or a default arrangement rule that is specified in terms of meta data that is associated with the graphic objects 76. For example, the page assignment module 62 may assign graphic objects 76 to pages chronologically based on date and time meta data that is associated with the graphic objects 76. Alternatively, the page assignment module 62 may assign graphic objects 76 to pages based on an event-based analysis of the graphic objects 76. The page assignment module 62 passes graphic object assignment data 78, which specifies the assignments of the graphic objects 76 to the pages, to the initial layout generator module 64.

The initial layout generator module 64 generates an initial arrangement 80 (or initial relative layout) of the graphic objects 76 on each page based on the graphic object assignment data 78 (FIG. 5, block 82). As used herein, the term "relative layout" refers to a layout of graphic objects on a page in which the relative positions of the graphic objects are specified but the absolute positions of the graphic objects are not specified. In some implementations, the initial layout generator module 64 stores the specifications of each relative page layout in a respective data structure that represents a binary tree, which has leaf nodes corresponding to graphic objects and interior nodes corresponding to divisions of the corresponding page.

In implementations that include the layout modification module 68, the initial layout generator module 64 passes the initial arrangements 80 of graphic objects 76 on the pages to the layout modification module 68. The layout modification module 68 then modifies the initial arrangements 80 of graphic objects (FIG. 5, block 84). As explained in detail below, the layout modification module 68 evolves each of the initial arrangements 80 from the initial state generated by the initial page layout generator module 64 to an end state that has an improved arrangement of graphic objects as determined by a heuristic measure for evaluating the layouts of graphic objects on pages.

If present, the layout modification module 68 passes the improved arrangements 86 of graphic objects to the final layout generator module 70. If the layout modification module 68 is not present, the initial layout generator module 64 passes the initial arrangements 80 of graphic objects 76 on the pages to the final layout generator module 70.

The final layout generator module 70 generates final arrangements of graphic objects on the pages from the arrangements received from either the initial layout generator module 64 or the layout modification module 68 (FIG. 5, block 88). In this process, the final layout generator module 70 determines a respective determinate layout 90 of the graphic objects on the one or more pages (block 86). As used herein, the term "determinate layout" or "final layout" refers to a layout of graphic objects on a page in which the positions and dimensions of the graphic objects are specified. In some implementations, the final layout generator module 70 renders the selected final layout in a predetermined final layout format (e.g., PDF).

In the processes of generating the initial arrangements 80, the improved arrangements 86, and the final arrangements 90 of graphic elements on the one or more pages (FIG. 5, blocks 82, 84, 88), the initial layout generator 64, the layout modification module 68, and the final layout generator module 70 generate various candidate arrangements and one set of final arrangements of graphic objects 76 on the one or more pages. The initial layout generator 64, the layout modification module 68, and the final layout generator module 70 pass specifications of these arrangements to the layout evaluation module 66, which determines layout feasibility, computes various layout dimensions for the graphic objects on the pages, and computes scores for the candidate arrangements. As explained in detail below, these feasibility test results, dimensions, and scores are used by the initial layout generator 64, the layout modification module 68, and the final layout generator module 70 to select the initial arrangements 80, the improved arrangements 86, and the final arrangements 90 of graphic objects from the various candidate arrangements that are generated.

The final layout generator module 70 passes the final determinate layouts 90 of the graphic objects on the one or more pages to the user interface module 72. In some implementations, the user interface module 72 allows a user to interactively browse the pages that are generated automatically by the graphic object arrangement system 60. The user interface module 72 also allows a user to specify edits to the pages. Any specified edits to a given page are interpreted by the user interface module 72. The user interface module 72 transmits the interpreted user command instructions to one or more of the initial layout generator module 64, the layout modification module 68, and the final layout generator module 70. The initial layout generator module 64, the layout modification module 68, and the final layout generator module 70 repeat one or more aspects of the method of FIG. 5 to determine another final layout 90 of one or more pages in accordance with the edits received from the user interface module 72. The user interface module 72 presents the revised pages to the user. The user then may browse the revised pages, specify edits to the one or more revised pages, or command the system 60 to render some or all of the pages.

A. Tree Structures

Figure 6:
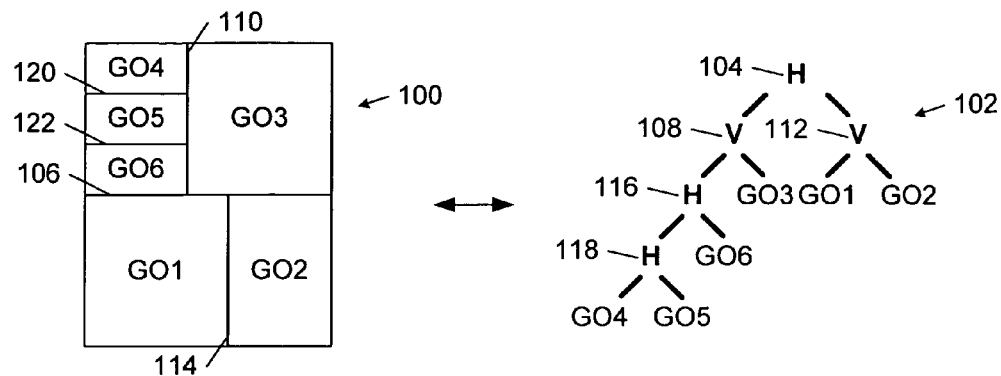
FIG. 6 is a diagrammatic view of a partition of a page and a hierarchical tree structure corresponding to the page partition.

Referring to FIG. 6, the initial layout generator module 64 divides each page 100 in accordance with a respective candidate relative layout, which is represented by a corresponding tree structure 102. Each leaf node of the tree structure 102 corresponds to a respective graphic object (GO1, GO2, GO3, GO4, GO5, GO6) on the page 100. Each interior node (H, V) of the tree structure 102 corresponds to one of either a horizontal or a vertical division on the corresponding page 100. In the exemplary candidate relative layout of page 100 and the corresponding tree structure 102, the root H node 104 represents the horizontal division 106 of page 100. The left interior V node 108 represents the upper vertical division 110 of page 100, and the right interior V node 112 represents the lower vertical division 114 of page 100. The interior H nodes 116, 118 respectively represent the horizontal divisions 122, 120 of page 100. The positions of leaf nodes in the tree structure 102 specify the unique relative locations of the corresponding graphic objects (GO1, GO2, GO3, GO4, GO5, and GO6) on the page 100.

B. Candidate Layout Evaluation

Candidate layout evaluation may include one or more of the following steps: determining whether a candidate layout is feasible; computing dimensions for the graphic objects; and computing a layout score. The layout evaluation module 66 has at its disposal a number of distinct evaluation methods. Which method is selected can depend upon the desired layout style and the requirements of the module issuing the request for the layout to be evaluated. Other factors, such as method runtime, computational resources and memory constraints can also influence the choice of layout evaluation method.

Figure 7A:
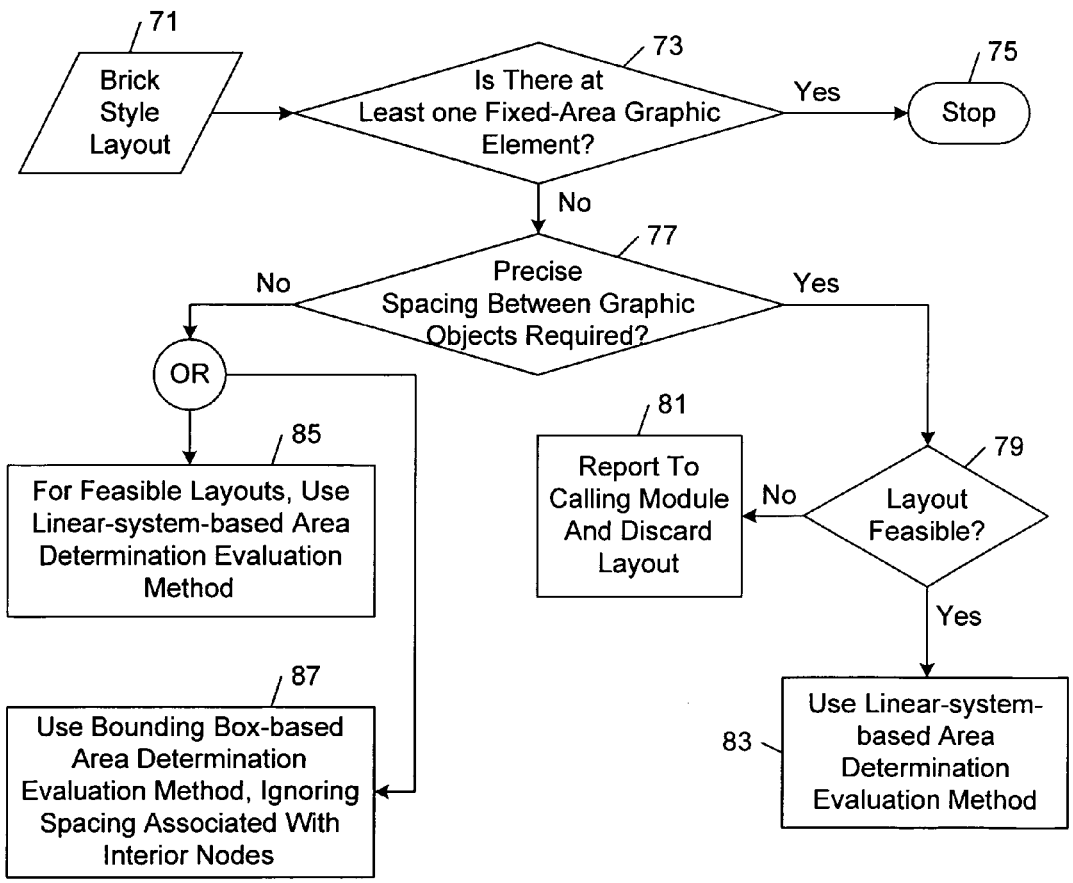
FIGS. 7A and 7B are flow diagrams of embodiments of methods of evaluating a layout of graphic objects on a page.
Figure 7B:
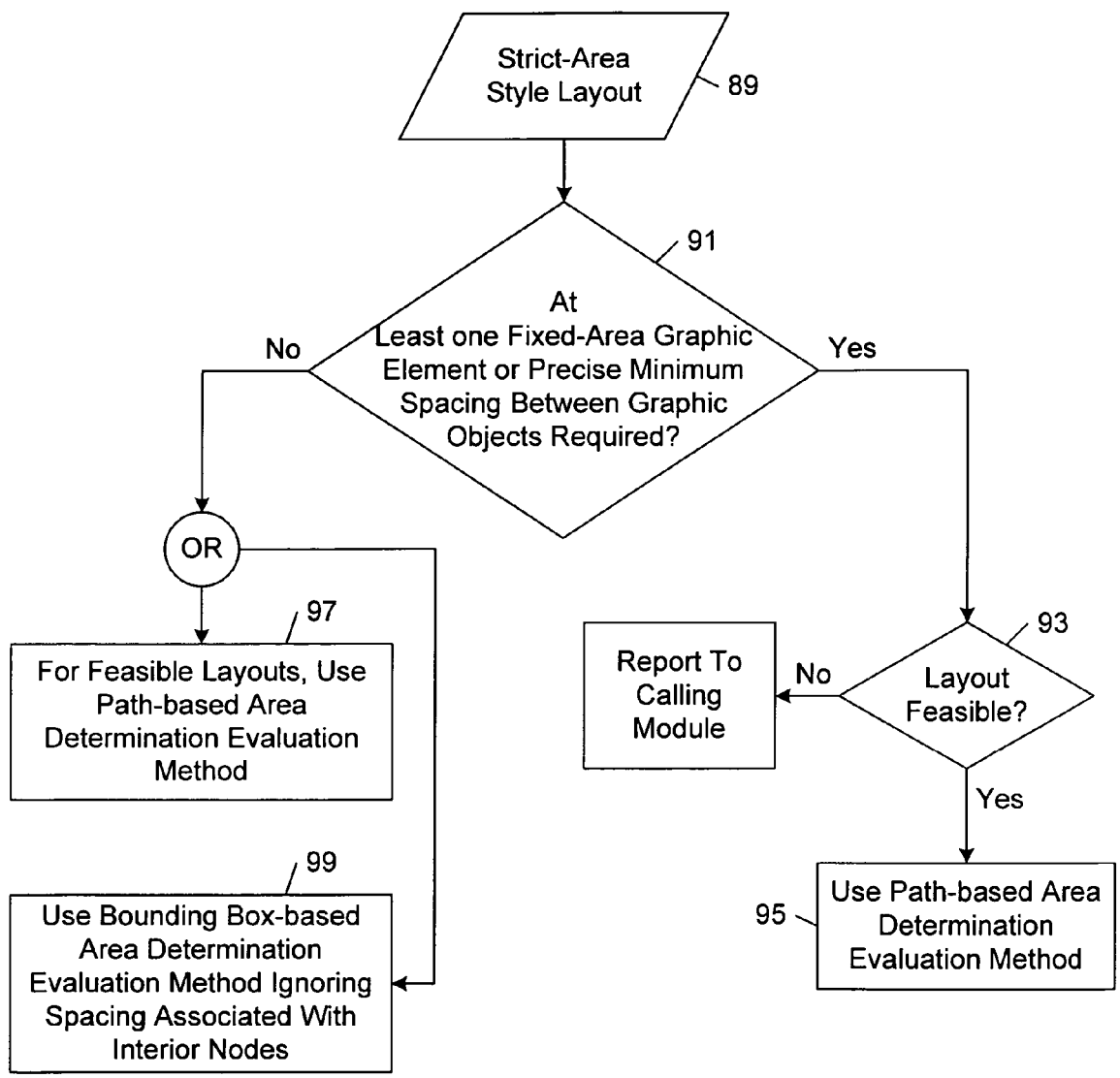

The process for selecting an evaluation method is shown in FIGS. 7A and 7B.

Referring to FIG. 7A, if brick layout style is desired (block 71), then a determination is made whether there is at least one fixed-area graphic object in the set of graphic objects to be laid out on the page (block 73). In the illustrated embodiment, a brick style layout is considered feasible only if all the graphic objects are of variable area. Therefore, if there is at least one fixed-area graphic object in the layout (block 73), the execution of the layout evaluation process terminates (block 75).

Assuming all graphic objects are of type variable-area, a second determination is made as to whether the calling module requires computation of graphic object areas subject to explicit constraints on spacing between adjacent graphic objects (block 77). If the response is in the affirmative, a check is first made as to whether the candidate tree represents a feasible layout as described in detail below (block 79). If the layout is infeasible (block 79), then the calling module is so informed and the candidate layout is discarded (block 81). If the layout is feasible (block 79), the calling module is so informed (if necessary) and the linear-system-based area determination evaluation method described in detail below is used to evaluate the layout (block 83).

If the calling module does not require adherence to constraints associated with spacing between graphic objects (block 77), then one of two procedures is executed by the layout evaluation module 66. In the first procedure, the layout evaluation module 66 verifies that the candidate layout is feasible and employs a linear-system-based area determination evaluation process (block 85). In the second procedure, the layout evaluation module 66 employs a bounding-box-based area determination evaluation process without testing layout feasibility (block 87). In a typical implementation, the second procedure (block 87) is faster than the first (block 85). In some embodiments, the following rule is used to select which one of the first and second procedures to use for evaluating a layout: if the calling module is either the initial layout generator module 64 or the layout modification module 68 then the second procedure (block 87) is used; and if the calling module is the final layout generator module 70, the first procedure (block 85) is used.

Referring to FIG. 7B, if strict area layout style is desired (block 89), then a determination is made as to whether the following is true: either there is at least one fixed-area graphic object in the candidate layout, or the calling module requires computation of graphic object areas subject to explicit constraints on spacing between adjacent graphic objects (block 91).

If there is at least one fixed-area graphic object in the candidate layout or the calling module requires computation of graphic object areas subject to explicit constraints on spacing between adjacent graphic objects (block 91), then a check is first made as to whether the candidate tree represents a feasible layout as described in detail below (block 93). If the layout is infeasible, then the calling module is so informed. If the layout is feasible, the calling module is so informed (if necessary) and the path-based area determination evaluation process described in detail below is used to evaluate the layout (block 95).

If there are no fixed-area objects in the candidate layout and the calling module does not require computation of graphic object areas subject to explicit constraints on spacing between adjacent graphic objects (block 91), then one of two available procedures can be followed. In the first procedure, the layout evaluation module 66 verifies that the candidate layout is feasible and employs a path-based area determination evaluation process (block 97) In the second procedure, the layout evaluation module 66 employs a bounding-box-based area determination evaluation process without testing layout feasibility (block 99). In a typical implementation, the second procedure (block 99) is faster than the first (block 97). In some embodiments, the following rule is used to select which of the first and second procedures to use for evaluating a layout: if the calling module is either the initial layout generator module 64 or the layout modification module 68 then the second procedure (block 99) is used; and if the calling module is the final layout generator module 70, the first procedure (block 97) is used.

1. Feasibility of Candidate Tree Structures a. Overview

In some embodiments, the layout evaluation module 66 first determines whether a current candidate tree structure represents a feasible candidate relative layout.

A candidate relative layout is feasible if the constituent graphic objects fit within the space available on the page, including consideration of fixed-area graphic objects and any user-specified and system-specified fixed spacing between graphic objects. In the embodiments described above, if there are no fixed-area graphic objects on the page and there is no constraint on spacing between adjacent graphic objects, then any layout is feasible. Thus, as can be deduced from FIGS. 7A and 7B, layout feasibility is only considered if the selected area determination module is either the path-based area determination module or the linear-system-based area determination module. Layout feasibility is not considered if the selected area determination module is the bounding-box-based area determination.

b. Determining Feasibility of Candidate Tree Structures

Figure 8:
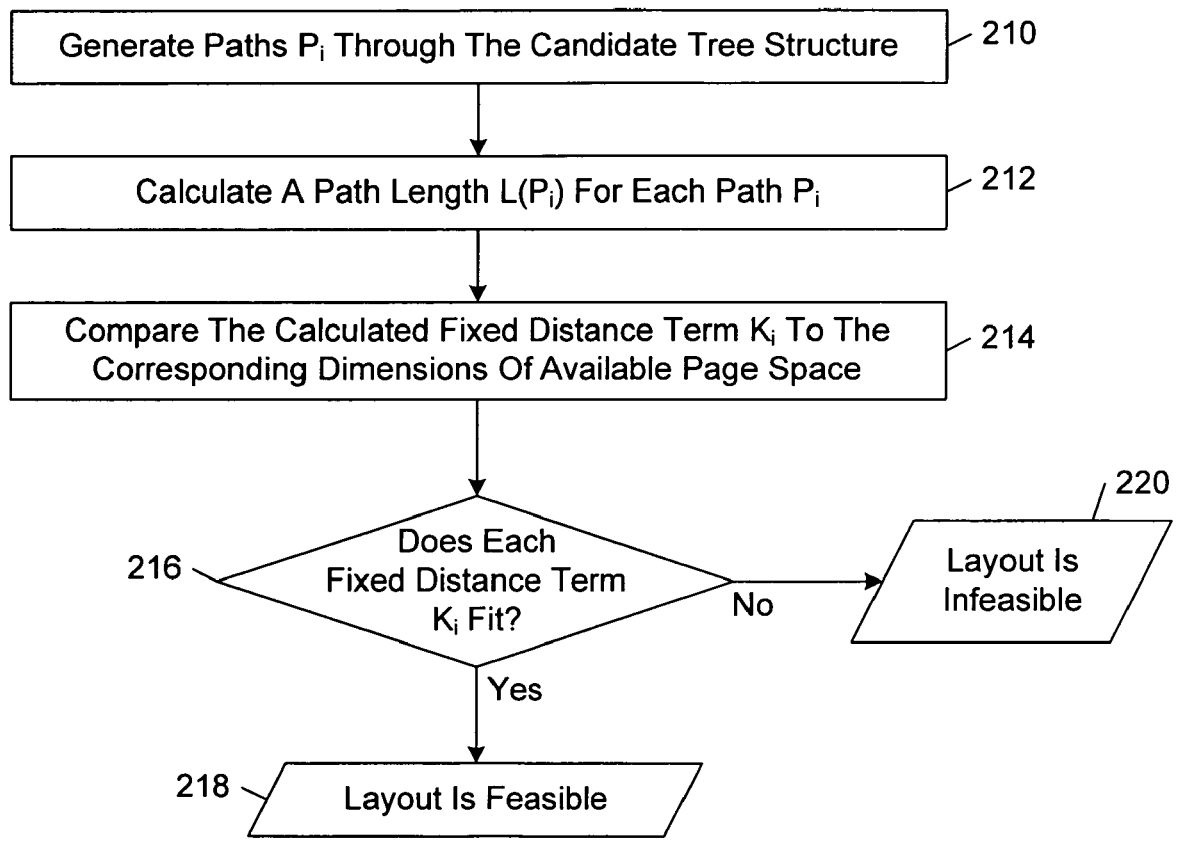
FIG. 8 is a flow diagram of an embodiment of a method of determining feasibility of paths through a tree structure.

FIG. 8 shows an embodiment by which the layout evaluation module 66 determines the feasibility of a candidate tree structure.

The layout evaluation module 66 generates paths $P_i$ through the candidate structure in accordance with the path generation process described below in connection with FIGS. 9-10J (FIG. 8, block 210).

The layout evaluation module 66 calculates a path length $L(P_i)$ for each path $P_i$ (FIG. 8, block 212). If path $P_i$ is vertical, then its length is $$L(P_i) = \text{sum (fixed distances through divisions along } P_i) + \quad (2)$$
$$\text{sum (heights of fixed-area graphic objects on } P_i) +$$
$$\text{sum (heights of variable-area graphic objects on } P_i)$$

The height ($H_{GO}$) of a graphic object can be written as follows:

$$H_{GO} = \sqrt{a \cdot A} = \sqrt{a} \cdot \sqrt{A} = Q \cdot \sqrt{a} \quad (3)$$

where A is the area of the graphic object, a is the aspect ratio defined as the ratio of the height divided by the width, and Q is the square root of the area. Therefore, if $P_i$ is a vertical path, its length can be written $$L(P_i) = K_i + \sum_{j \in G_i} Q_{i,j} \cdot \sqrt{a_{i,j}} \quad (4)$$

where $K_i$ is the sum of the first two terms in equation (2) (i.e., all the fixed distances along path $P_i$); $Q_{i,j}$ is the square root of the area of the j-th variable area object on path $P_i$; and $a_{i,j}$ is the aspect ratio of the j-th variable area object on path $P_i$. Note that the summation term corresponds to the sum of the heights of variable area graphic objects on path $P_i$.

From a similar derivation, the length of horizontal path $P_i$ can be written $$L(P_i) = K_i + \sum_{j \in G_i} \frac{Q_{i,j}}{\sqrt{a_{i,j}}} \quad (5)$$

where $K_i$ is a sum of horizontal fixed distances and widths of fixed-area graphic objects along path $P_i$.

The layout evaluation module 66 compares the fixed-distance terms of the paths $K_i$ to the corresponding dimensions of the available page space (FIG. 8, block 214).

If each fixed-distance term fits within the available page space (i.e., $K_i \leq$ corresponding page space dimension for each path Pi) (FIG. 8, block 216), the layout evaluation module 66 designates the layout as feasible (FIG. 8, block 218). Otherwise, the layout evaluation module 66 designates the layout as infeasible (FIG. 8, block 220).

c. Generating Paths i. Overview of Path Generation Method

Figure 9:
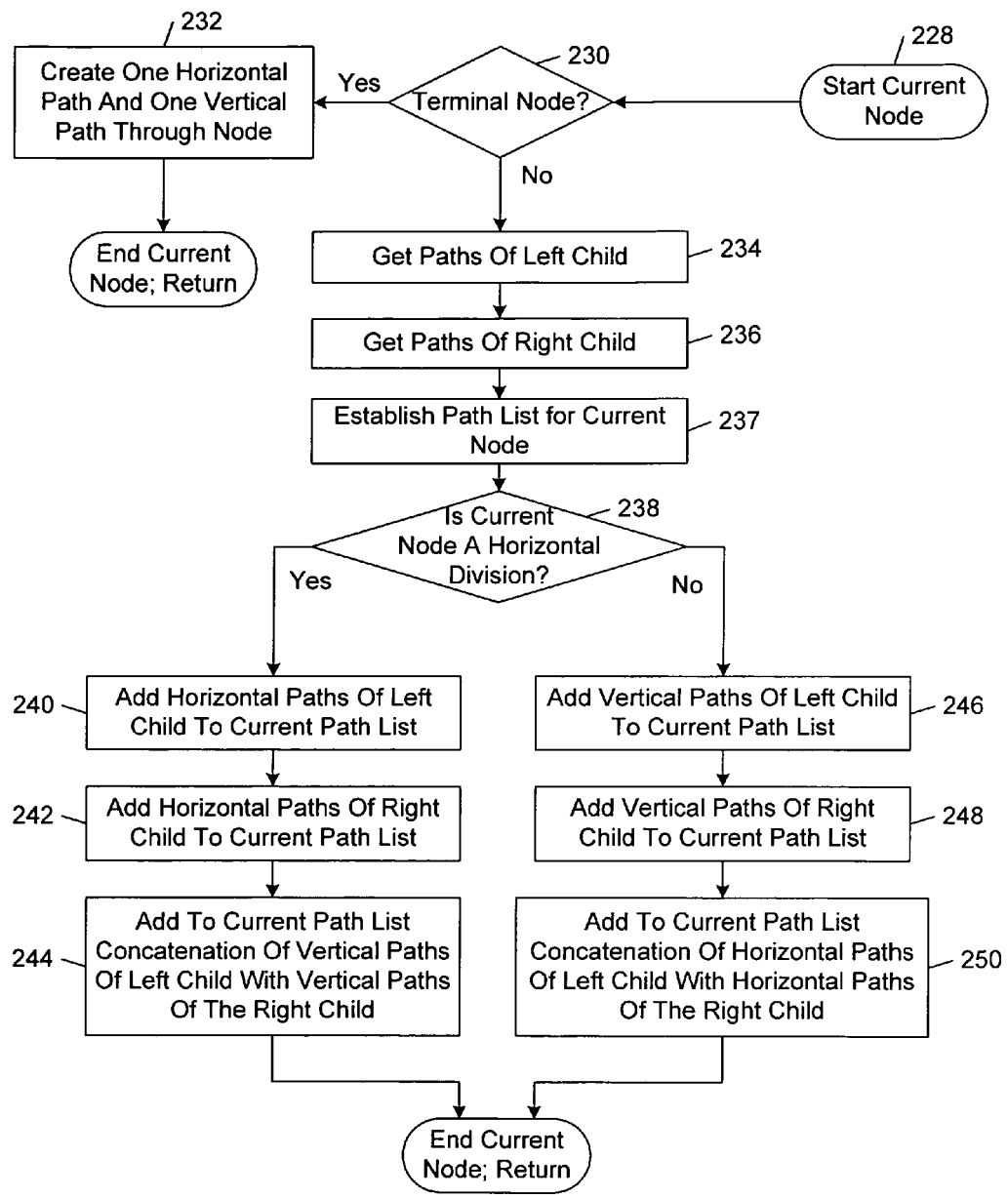
FIG. 9 is a flow diagram of an embodiment of a method of generating a set of paths through relative layouts of graphic objects on a page.

FIG. 9 shows a flow diagram of an embodiment of a method of generating a set of paths through a relative layout of graphic objects on a page.

Briefly, the path generation method of FIG. 9 is executed once for each node in the tree structure corresponding to the relative layout. That is, each node is in its turn the "current node" with respect to which a respective instance of the path generation method begins at block 228. The output of each instance of the path generation method is a set of paths that correspond to the current node. When a current node is a terminal node (i.e., a leaf node), two new paths are established for the current node in block 232. When a current node is an interior node, the current instance of the method is divided into two stages. In the first stage, respective instances of the method are executed for the left and right child nodes of the current node in blocks 234 and 236. In the second stage, the paths for the left and right child nodes are combined to form the paths of the current node in blocks 238-250. When a node is the root node, the paths that result from the corresponding instance of the path generation method are a complete set of paths for the relative layout being processed.

ii. Detailed Description of Path Generation Method

Initially, the path generation method begins at block 228 with the root node of a given candidate relative layout. The path generation method recursively determines the paths for each of the interior and terminal nodes to obtain a complete set of paths through the current candidate relative layout. In the recursive process, the current node is input into the process and a decision is made at block 230 whether or not the current node is a terminal node.

If the current node is a terminal node, two new paths are started at block 232: a horizontal path with a single step traveling through the graphic object associated with the terminal node (e.g., from left to right), and a vertical path with a single step traveling through the graphic object (e.g., from top to bottom). After block 232, the instance of the path generation method that is associated with the current terminal node is complete.

If the current node is not a terminal node (block 230), blocks 234 and 236 submit the two child nodes of the current internal node (i.e., the left child node and the right child node) as current nodes that are processed beginning at node 228 in respective instances of the path generation method. The instance of the method being executed for the current parent node is on hold during the execution of the instances of the method for the child nodes. In the illustrated embodiment, the instance of the path generation method for the right child is executed after the instance of the path generation method for the left child is completed. The results of the instances of the path generation method that are executed for the left and right child nodes are two sets of paths.

In blocks 237-250, the paths that are determined for the two child nodes are combined. Block 237 establishes a path list for the current node. Block 238 determines if the current internal node represents a horizontal division or a vertical division. If the internal node represents a horizontal division, then the node inherits the horizontal paths of its children (blocks 240, 242) and combines the vertical paths of its children (block 244). In particular, if the current internal node represents a horizontal division, then the current internal node inherits each of the $N_{LH}$ horizontal paths of its left child (block 240), and each of the $N_{RH}$ horizontal paths of its right child (block 242). At block 244, the current internal node obtains a new set of vertical paths by concatenating each of the $N_{LV}$ vertical paths of the left-hand child in its turn with each of the $N_{RV}$ vertical paths of the right-hand child to form ($N_{LV}*N_{RV}$) vertical paths of the current node. The total number of paths is equal to $N_{LH}+N_{RH}+(N_{LV}\times N_{RV})$.

If the internal node represents a vertical division, then the node inherits the vertical paths of its children (blocks 246, 248), and combines the horizontal paths of its children (block 250). In particular, if the internal node represents a vertical division, then the node inherits each of the $N_{LV}$ vertical paths of its left child (block 246), and each of the $N_{RV}$ vertical paths of its right child (block 248). At block 250, the node obtains a new set of horizontal paths by concatenating each of the $N_{LH}$ horizontal paths of the left-hand child in its turn with each of the $N_{RH}$ horizontal paths of the right-hand child, to form ($N_{LH}\times N_{RH}$) horizontal paths of the current node. The number of paths is thus equal to $N_{LV}+N_{RV}+(N_{LH}\times N_{RH})$.

When a given instance of the path generation method that is being executed for a node is completed (e.g., after blocks 232, 244, and 250), process control returns to the instance that invoked the given instance. When the instance initiated for the root node is completed, the set of paths associated with the root node is the complete set of paths for the relative layout and the path generation method terminates.

iii. Application of the Path Generation Method to an Exemplary Candidate Relative Layout FIGS. 10A-10J show the paths that are generated by the path generation method of FIG. 9 for the respective nodes of a tree structure 252 corresponding to an exemplary candidate relative layout 253.

Figure 10A:
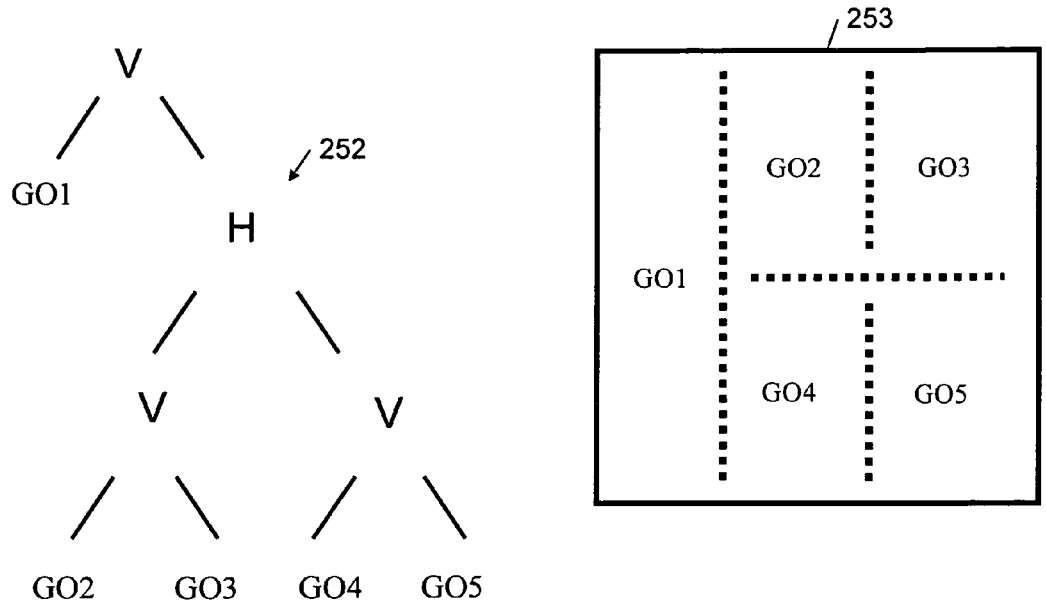
FIGS. 10A-10J show sets of paths generated in accordance with the method of FIG. 9 with respect to an exemplary candidate relative layout.

FIG. 10A shows the tree structure 252 and the corresponding candidate relative layout 253 before the path generation process begins. The horizontal and vertical divisions in the candidate relative layout 252 are shown as dashed lines.

Each of the FIGS. 10B-10J, shows a respective version of the tree structure 252 in which the paths that have been generated up to the completion of an instance of the path generation method for a respective current node, which is circled in the drawings, are shown at the corresponding node locations. The corresponding paths are shown as arrows that are superimposed over the relative layout 253. In the tree structures, each of the paths is denoted by an arrow preceding a respective list of graphic objects. An arrow pointing right preceding a list of graphic objects indicates a horizontal path through the graphic objects. An arrow pointing down preceding a list of graphic objects indicates a vertical path through the graphic objects. For example, "→GO4" indicates a horizontal path through the graphic object GO4; and "→GO4, GO5" indicates a horizontal path through graphic objects GO4 and GO5.

Figure 10B:
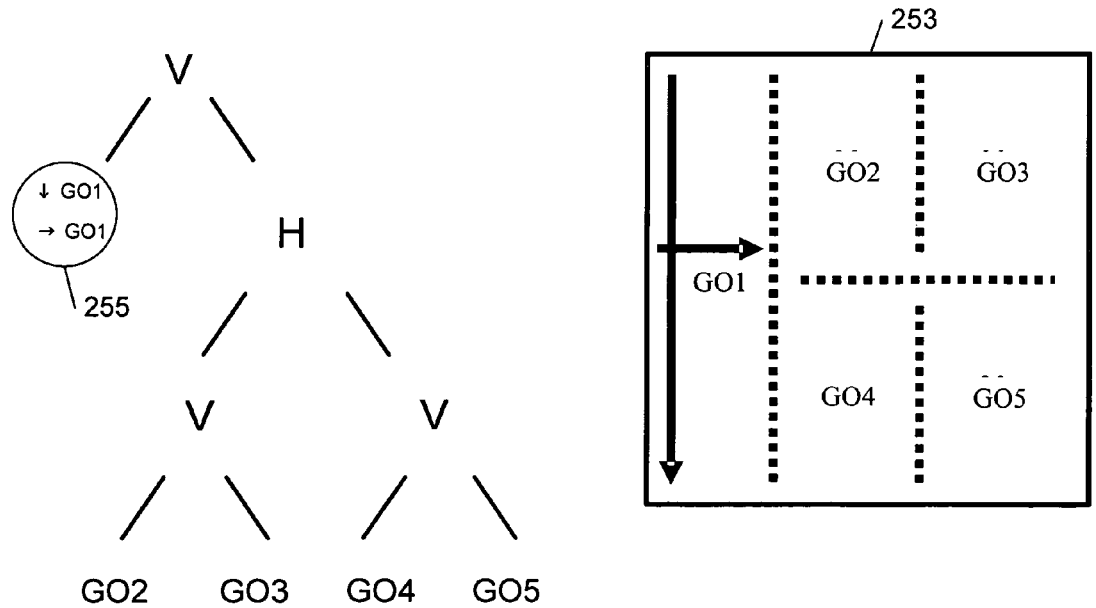

FIG. 10B shows the horizontal and vertical paths that are created in block 232 through the terminal node 255 corresponding to graphic object GO1.

Figure 10C:
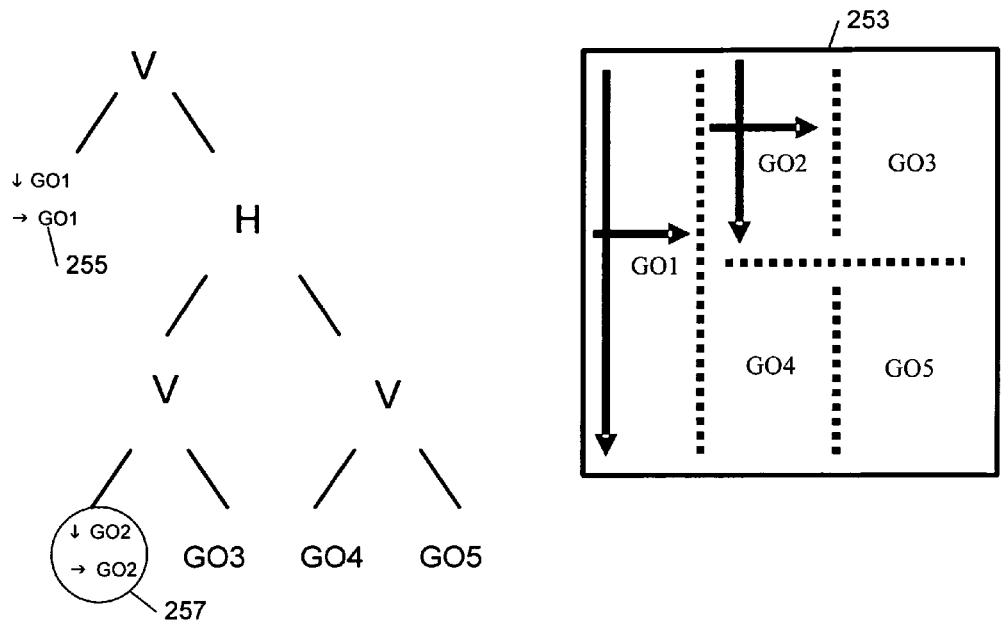
Figure 10D:
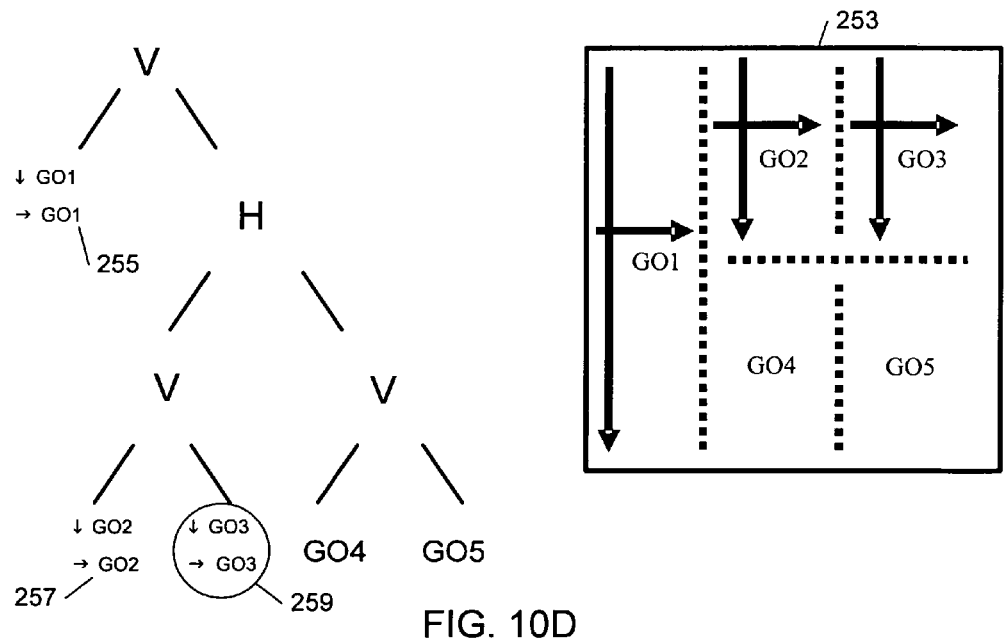
Figure 10E:
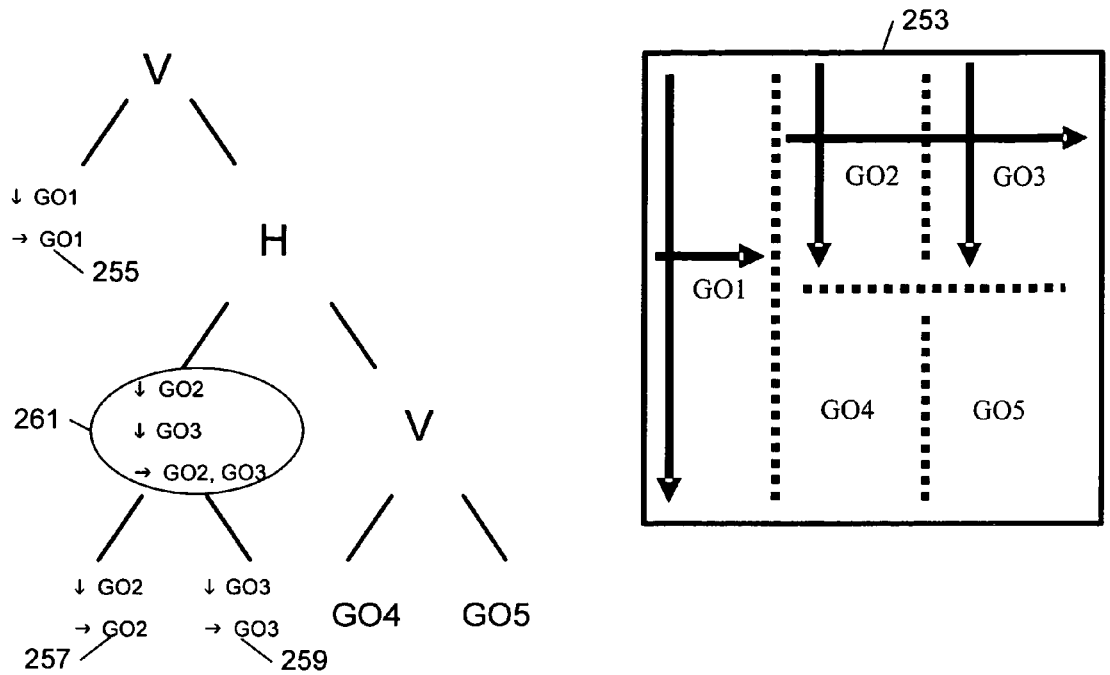

FIG. 10C shows the horizontal and vertical paths that are created in block 232 through the terminal node 257 corresponding to graphic object GO2. FIG. 10D shows the horizontal and vertical paths that are created in block 232 through the terminal node 259 corresponding to graphic object GO1. FIG. 10E shows at the vertical parent node 261 the combination of the paths through GO2 and GO3 that is generated in blocks 240-244 for the vertical parent node 261.

Figure 10F:
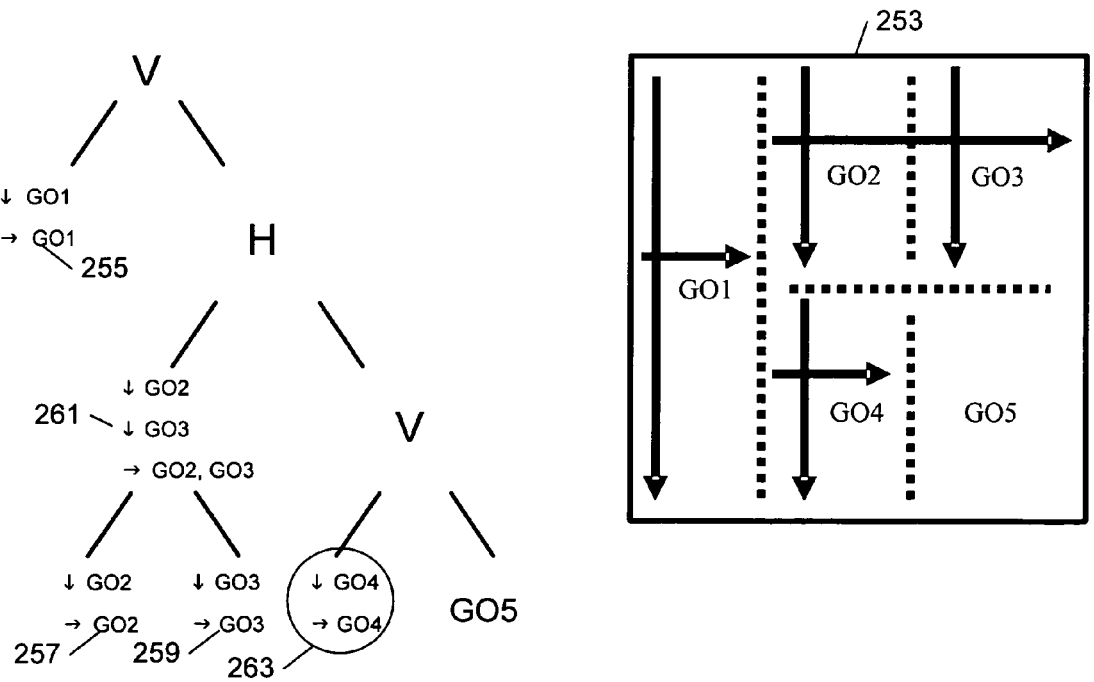
Figure 10G:
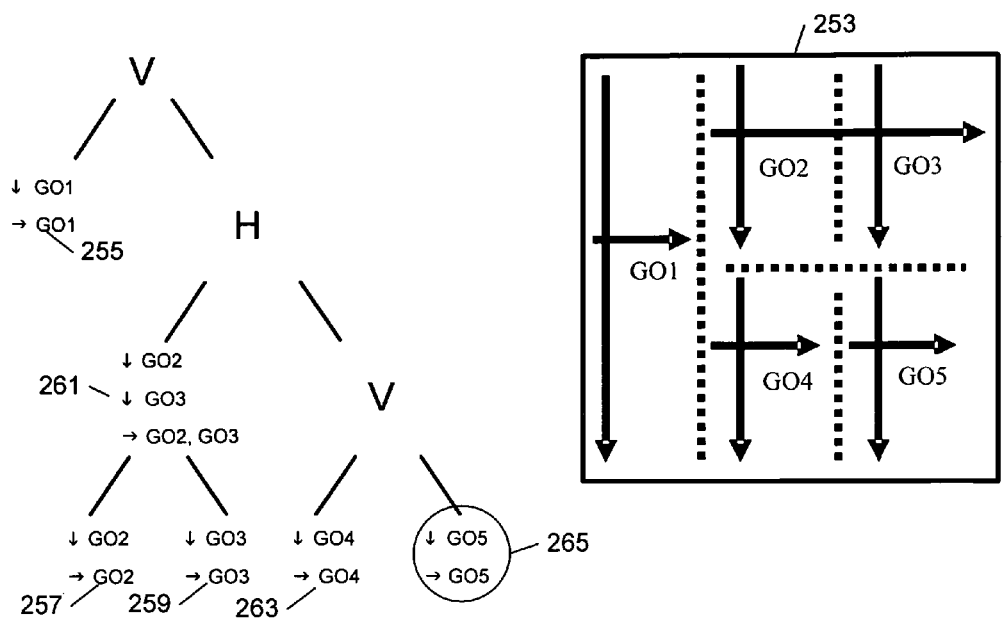
Figure 10H:
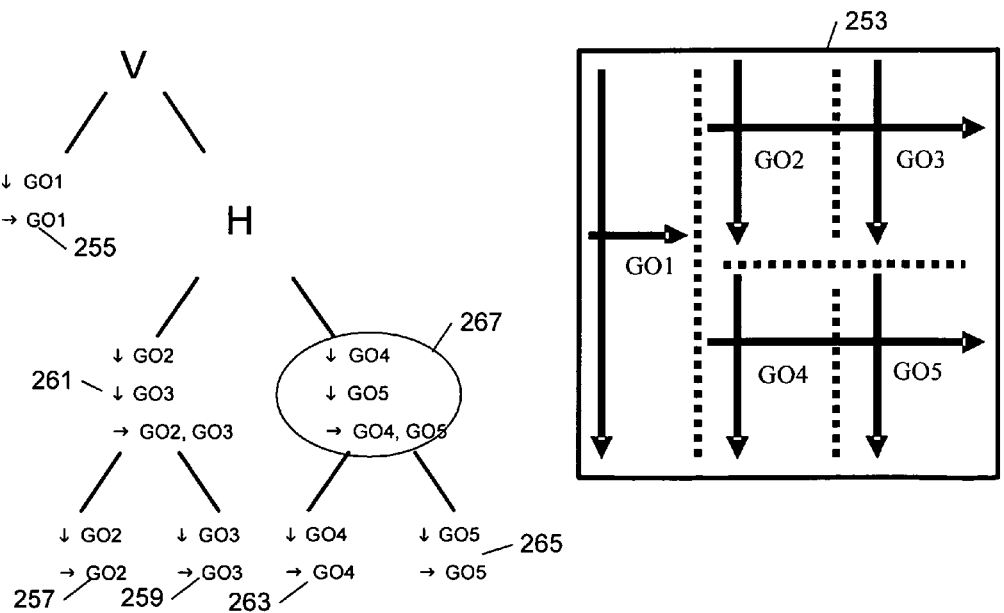

FIG. 10F shows the horizontal and vertical paths that are created in block 232 through the terminal node 263 corresponding to graphic object GO4. FIG. 10G shows the horizontal and vertical paths that are created in block 232 through the terminal node 265 corresponding to graphic object GO5. FIG. 10H shows at the vertical parent node 267 the combination of the paths through GO2 and GO3 that is generated in blocks 240-244 for the vertical parent node 267.

Figure 10I:
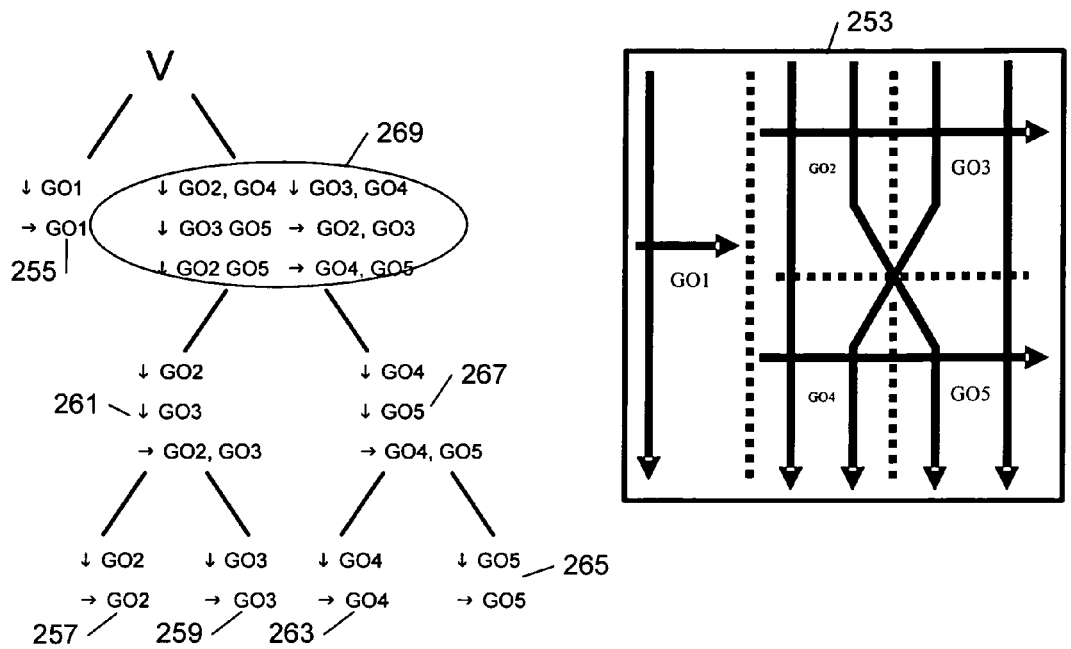

FIG. 10I shows at the horizontal parent node 269 the combination of the paths through the vertical nodes 261, 267 that is generated in blocks 246-250 for the horizontal parent node 269.

Figure 10J:
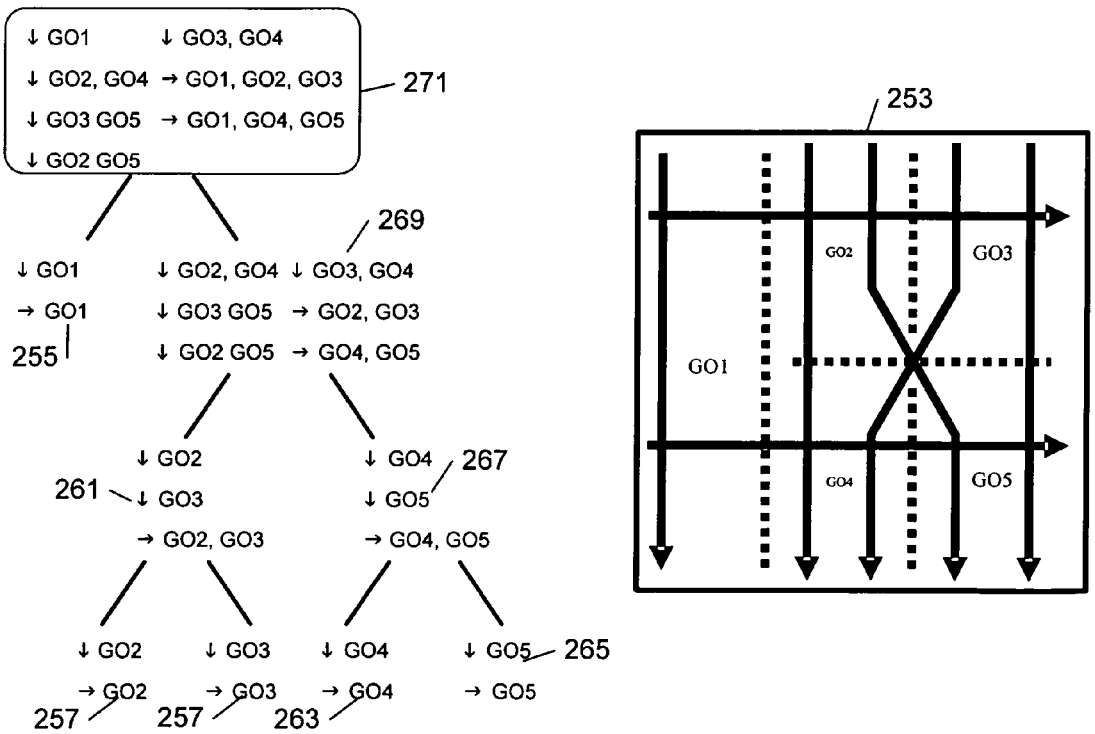

FIG. 10J shows at the vertical root node 271 the complete set of paths through the candidate relative layout 253 corresponding combination of the paths through the terminal node 255 and the vertical node 269 that is generated in blocks 246-250 for the root node 271.

2. Evaluating Candidate Tree Structures

In the embodiments that are described in this section of the application, the score that is used to evaluate a candidate relative layout depends on measures of area occupied by the graphic objects on the page.

a. Determining Areas of Graphic Objects

The layout evaluation module 66 calculates the areas occupied by the graphic objects that are specified in a given instance of a candidate relative layout in accordance with a bounding-box-based determination process, a path-based determination process or a linear-system based determination process.

i. Bounding-Box-Based Determination of Graphic Object Areas

In the illustrated embodiments, the objective of the bounding box determination process is to compute an aspect ratio value and relative area value for each interior node in a given tree structure. Each bounding box is determined by the boxes it encloses.

As will be described in greater detail below, the bounding boxes are computed using the relative areas of the graphic objects. In "strict-area" layout, the relative areas of the graphic objects are defined beforehand and also regarded as unchangeable. In this case, the actual values of the relative area proportions may have been provided at system input from the user or from the system making use of this invention. In brick style layout, the relative area proportions of the graphic objects depend upon the aspect ratios of the graphic objects taken in conjunction with the tree structure itself, using a process described in U.S. patent application Ser. No. 10/675,724, filed Sep. 30, 2004, by C. Brian Atkins and entitled "Automatic Photo Album Layout."

Figure 11:
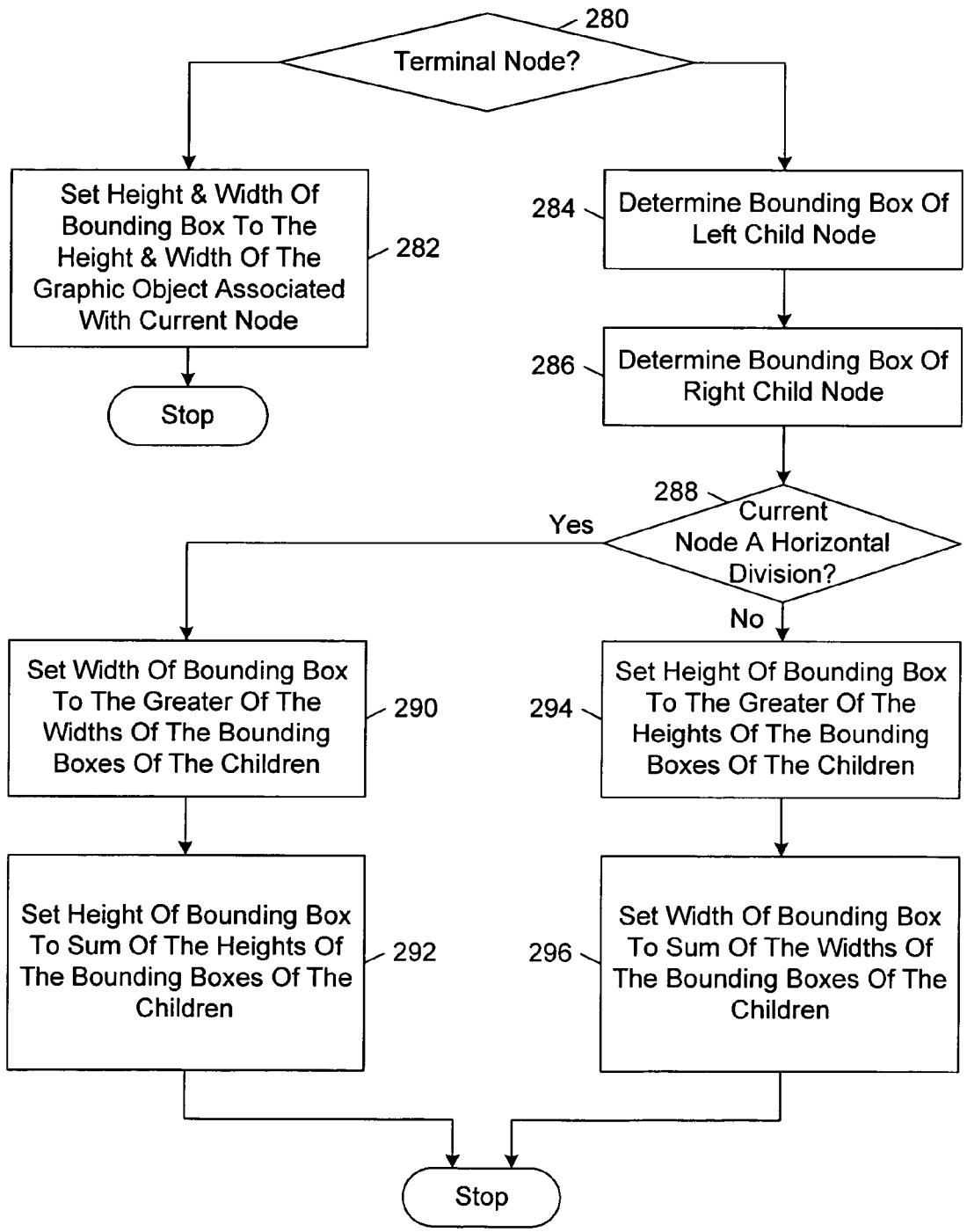
FIG. 11 is a flow diagram of an embodiment of a method of characterizing a bounding box of a node of a tree structure.

In some implementations, the bounding box characterization process begins at the leaf nodes and works toward the root node, in the order of a depth-first search, as illustrated in FIG. 11.

The formulas for the aspect ratio and relative area of any interior node are given below. In general, for any image bounding box with an aspect ratio a, and a relative area proportion (RAP), e, the quantities $\sqrt{ae}$ and $\sqrt{e/a}$ are the relative height and relative width of the image bounding box, respectively. The aspect ratio, a, and the relative area, e, for any interior node are functions of the aspect ratios and relative areas of its two children. In the following equations, $a_r$ and $e_r$ are the aspect ratio and relative area of the right-hand child node, and $a_l$ and $e_l$ are the aspect ratio and relative area of the left-hand child node. Thus, if the right-hand and left-hand child nodes are arranged side-by-side, the aspect ratio and relative area of the bounding box that encloses them are:

$$a = \frac{\sqrt{a'e'}}{\sqrt{e_l/a_l} + \sqrt{e_r/a_r}} \quad (6)$$

$$e = \sqrt{a'e'}\left(\sqrt{e_l/a_l} + \sqrt{e_r/a_r}\right) \text{ where} \quad (7)$$

$$\sqrt{a'e'} = \max_{i \in \{r,l\}}\left(\sqrt{a_i e_i}\right) \quad (8)$$

The aspect ratio in equation (6) is the ratio of the greater relative height divided by the sum of the two relative widths, and the relative area in equation (7) is the product of the greater relative height and the sum of the two relative widths. Finding the maximum in equation (8) determines which of the two child node boxes is relatively taller, and therefore governs the height of the parent node box.

If the two child nodes represent boxes that are arranged one on top of the other, the aspect ratio and relative area of the bounding box that encloses them are:

$$a = \frac{\sqrt{a_l e_l} + \sqrt{a_r e_r}}{\sqrt{e'/a'}} \quad (9)$$

-continued $$e = \left(\sqrt{a_l e_l} + \sqrt{a_r e_r}\right)\sqrt{e'/a'} \text{ where} \quad (10)$$

$$\sqrt{e'/a'} = \max_{i \in \{r,l\}}\left(\sqrt{e_i/a_i}\right) \quad (11)$$

In this case, equation (11) determines which of the two child node boxes is relatively wider, and therefore governs the width of the parent node box.

The bounding box of the root node conveys the shape and relative area of the entire layout corresponding to the tree structure 80. The bounding box of the root node is referred to herein as the "principal bounding box".

When the aspect ratio and relative area of the principal bounding box are known, the bounding-box based area $A_i$ for graphic object i is computed as $$A_i = \frac{e_i}{e_{pbb}} A_{pbb} \quad (12)$$

where $e_i$ and $e_{pbb}$ are the relative area proportions of graphic object i and the principal bounding box respectively, and where $A_{pbb}$ is an area for the principal bounding box, computed as $$A_{pbb} = A_{page} \frac{\min\{a_{pbb}, a_{page}\}}{\max\{a_{pbb}, a_{page}\}} \quad (13)$$

where $A_{page}$ is the area of the usable page space.

FIG. 11 shows a flow diagram of an embodiment of a recursive process by which the layout evaluation module 66 calculates relative height and width dimensions of the bounding boxes for the nodes of a tree structure.

The process begins with the root node as the current node. A decision is made whether the current node is a terminal node (FIG. 11, block 280). If the current node is a terminal node, a bounding box is established that has the relative height and width of the associated graphic object (FIG. 11, block 282). If the current node is not a terminal node, the two child nodes of the current node (i.e., the left child node and the right child node) are submitted to the same recursive process (FIG. 11, blocks 284, 286). The bounding boxes of the two children are combined to form the bounding box for the current node as follows. The layout evaluation module 66 determines if the current node is a horizontal division or a vertical division (FIG. 11, block 288). If current node represents a horizontal division, then the relative width of the bounding box is set to the relative width of the wider of the bounding boxes of the two children (FIG. 11, block 290) and the relative height of the bounding box is set to the sum of the relative heights of the bounding boxes of the two children. If the current node represents a vertical division (FIG. 11, block 288), the relative height of the bounding box is set to the relative height of the taller of the bounding boxes of the two children (FIG. 11, block 294) and the relative width of the bounding box is set to the sum of the relative widths of the bounding boxes of the two children. This process repeats until the bounding box for the root node is computed.

ii. Path-Based Determination of Graphic Object Areas

In strict area style layout, each variable-area graphic assembly has an assigned relative area proportion (RAP, which is denoted by the variable e). In the context of a multi-element graphic object, which has more than one constituent single-element graphic object (such as a series of keyframes from a video), a single aggregate RAP is assigned to the entire graphic object and the RAPs of the individual graphic objects in the multi-element graphic object are set to equal the aggregate RAP divided by the number of graphic objects in the graphic object. In the remainder of this section it is assumed that each graphic object j on a path $P_i$ is a single-element graphic object that has a positive relative area proportion $e_j$. Since a RAP is proportional to the actual area, the variable Q, which is defined above, can be generalized to reflect the square root of a relative area (rather than an absolute area) as follows:

$$Q = g \cdot \sqrt{e} \qquad (14)$$

where g is a positive scalar such that $g^2$ multiplied by the RAP is an absolute measurable area (e.g., square inches). The ratio of Q divided by $\sqrt{e}$ is a constant across all variable-area graphic objects, so that the same value of g is used for all variable-area graphic objects on the page. Thus, in equations (4) and (5) above, when substituting $g \cdot \sqrt{e}$ for Q, g can be pulled out of the summation terms to arrive at:

$$L(P_i) = K_i + g \cdot \sum_{j \in G_i} \sqrt{e_{i,j}} \cdot \sqrt{a_{i,j}} \qquad (15)$$

$$L(P_i) = K_i + g \cdot \sum_{j \in G_i} \frac{\sqrt{e_{i,j}}}{\sqrt{a_{i,j}}} \qquad (16)$$

where $e_{i,j}$ is the relative area proportion of the $j^{th}$ variable-area graphic object on path $P_i$.

If path $P_i$ is a vertical path and the available area on the page has height $H_{PAGE}$, then solving the following equation for $g_i$ yields the value for which $P_i$ is exactly as long as the available area is high:

$$H_{PAGE} = K_i + g_i \cdot \sum_{j \in G_i} \sqrt{e_{i,j}} \cdot \sqrt{a_{i,j}} \qquad (17)$$

Similarly, if path $P_i$ is a horizontal path and the available area has width $W_{PAGE}$, then solving the following equation for $g_i$ yields the value for which the path fits exactly across the width of the available area:

$$W_{PAGE} = K_i + g_i \cdot \sum_{j \in G_i} \frac{\sqrt{e_{i,j}}}{\sqrt{a_{i,j}}} \qquad (18)$$

In one embodiment, areas for variable-area graphic objects are made as large as possible, while still allowing all the graphic objects to fall completely on the usable area of the page, by (for each path $P_i$) solving for $g_i$ using either equation (17) or (18), depending on whether $P_i$ is a vertical or horizontal path. Because the layout has previously been determined to be feasible, as described above, each solution for $g_i$ will be positive. If $g^*$ is defined to be the smallest solution across all the paths:

$$g^* = \min_i \{g_i\} \qquad (19)$$

then the area $A_j$ of the $j^{th}$ variable-area graphic object is computed as $$A_j = (g^*)^2 \cdot e_j \qquad (20)$$

where $e_j$ is the RAP assigned to the $j^{th}$ variable-area graphic object.

iii. Linear-System-Based Determination of Graphic Object Areas

In brick style layouts, graphic element areas are determined by first computing values of Q. Once the values of Q are known, they can be squared to compute absolute, measurable areas (e.g., square inches). Values of Q are computed for two hypothetical scenarios: (I) the height of the area occupied by graphic elements is constrained to equal the height of the usable area on the page; and (II) the width of the area occupied by graphic elements is constrained to equal the width of the usable area on the page. In most cases, only one of scenarios (I) and (II) will yield a feasible solution because in the other scenario, the unconstrained dimension will be greater than the available space. The scenario yielding the feasible solution is selected to produce the final set of graphic element areas.

In either scenario (I) or (II), values of Q are computed as the solution to a linear system of equations having N unknowns, where N is the number of graphic elements. Each of N−1 of the equations comes from an interior node of the complete tree structure, because in a tree accommodating N graphic elements, there are exactly (N−1) interior nodes.

For an interior node that represents a vertical division or cut of the area, the corresponding equation is derived by first obtaining two vertical paths, one path from each of its two children, and setting their lengths to be equal. Referring to equation (16) above, denoting the vertical path from the left-hand child as $P_L$ and from the right-hand child as $P_R$, the corresponding expression is given by:

$$K_R + \sum_{j \in G_R} Q_{R,j} \cdot \sqrt{a_{R,j}} = K_L + \sum_{k \in G_L} Q_{L,k} \cdot \sqrt{a_{L,k}} \qquad (21)$$

where the variable j indexes the graphic objects along $P_R$ and k indexes the graphic objects along $P_L$. Rearranging equation (21) yields $$\sum_{j \in G_R} Q_{R,j} \cdot \sqrt{a_{R,j}} - \sum_{k \in G_L} Q_{L,k} \cdot \sqrt{a_{L,k}} = K_L - K_R \qquad (22)$$

The situation is analogous for an interior node that represents a horizontal division or cut of the area. Two horizontal paths are obtained, and their lengths set to be equal, yielding $$\sum_{j \in G_R} \frac{Q_{R,j}}{\sqrt{a_{R,j}}} - \sum_{k \in G_L} \frac{Q_{L,k}}{\sqrt{a_{L,k}}} = K_L - K_R \qquad (23)$$

By constructing an equation of the form of either (22) or (23) for each interior node, N−1 equations are obtained for N unknowns.

For scenario I, the $N^{th}$ equation is obtained by setting the length of any vertical path from the root node equal the height of the available area. For scenario II, the $N^{th}$ equation is obtained by setting the length of any horizontal path from the root node equal the width of the available area.

For both scenarios I and II, the N equations are written in matrix-vector form (Ax=b). The matrix contains only zeros, positive and negative square roots of graphic element aspect ratios, and positive and negative inverses of square roots of graphic element aspect ratios. The N elements of vector x are the Q variables, and b is a column vector of dimension N where each element is computed as the right-hand side of either (22) or (23), or is equal to the height (scenario I) or width (scenario II) of the available area. Computing inverse (A)*b yields the vector of Q values.

b. Scoring Tree Structures

In some embodiments, the initial layout generator module 64 selects candidate layouts by identifying those having the highest fitness or score. These scores are computed by the layout evaluation module 66.

In embodiments where strict area layout style is desired, the layout evaluation module 66 computes a layout score that corresponds to coverage, which is defined as the fraction of the page occupied by graphic objects. In the illustrated embodiments, coverage is computed as the sum of the graphic object areas on the page. These areas may have been computed either by the path-based area determination method, or by the bounding-box based area determination method.

In embodiments where brick layout style is desired, the score is computed as a blend of two score components, coverage and consistency. When the two components have been computed for a candidate layout, the score is computed as $$\text{Score} = 1.5 \cdot \alpha + v \tag{24}$$

The variable a measures how well the aspect ratio of the usable area on the page agrees with the aspect ratio of the principal bounding box. The variable v measures consistency, which is the variation in the areas occupied by graphic objects on the page. In some embodiments, each of the variables a and v has a value in the range of 0 and 1, where 0 corresponds to low coverage and consistency and 1 corresponds to high coverage and consistency. In these embodiments, the variable $\alpha$ is computed as follows:

$$\alpha = \frac{\min(\text{page\_aspect}, \text{pbb\_aspect})}{\max(\text{page\_aspect}, \text{pbb\_aspect})} \tag{25}$$

where page_aspect is the aspect ratio of the usable area on the page, and pbb_aspect is the aspect ratio of the principal bounding box (i.e., the bounding box associated with the root node). The variable v is computed as follows:

$$v = \frac{\min(\text{area of graphic objects on page})}{\max(\text{area of graphic objects on page})} \tag{26}$$

In equation (26), the graphic object areas may be computed by either the linear-system based area determination method or the bounding-box based area determination method. In these embodiments, the consistency measure v is defined to be the minimum graphic object area divided by the maximum graphic object area.

Other embodiments may us different scoring functions for brick style layouts. For example, the score computed in accordance with equation (24) may be penalized for values of $\alpha$ and/or v that are below predetermined thresholds. In some implementations, the values of $\alpha$ and/or v may take into account any space between graphic objects.

III. Generating an Initial Arrangement of Graphic Objects on a Page

A. Overview of Process of Generating an Initial Arrangement of Graphic Objects

Figure 12:
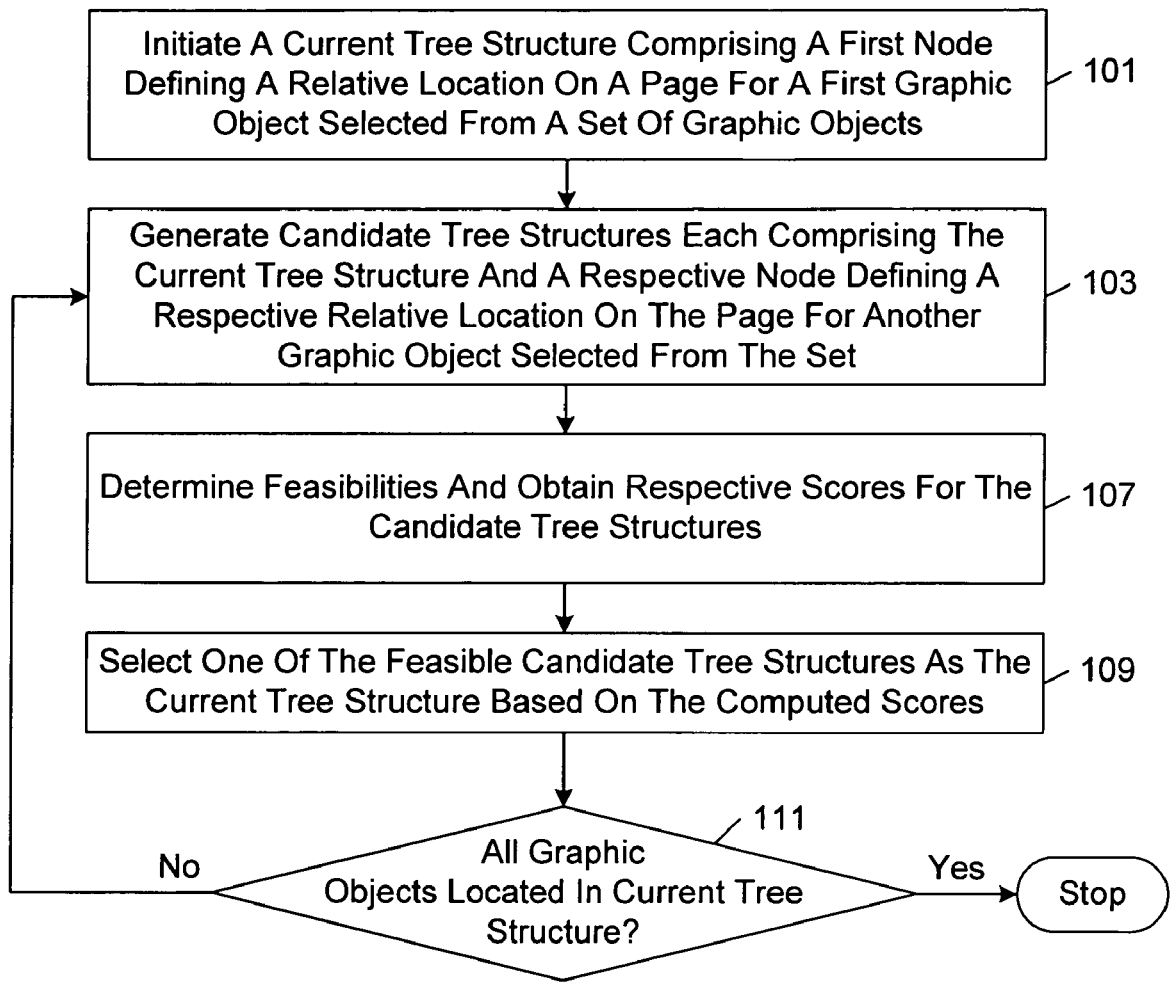
FIG. 12 is a flow diagram of an embodiment of a method of generating an initial arrangement of graphic objects on a page.

FIG. 12 shows a flow diagram of an embodiment of a method by which the initial layout generator module 64 generates a binary tree structure defining an initial arrangement 80 of graphic objects 76 on a page.

The initial layout generator module 64 initiates a current tree structure that includes a first node, which defines a relative location on a selected one of the pages for a first graphic object selected from a set of graphic objects (FIG. 12, block 101).

The initial layout generator module 64 generates candidate tree structures each comprising the current tree structure and a respective node defining a respective relative location on the selected page for another graphic object selected from the set (FIG. 12, block 103). The initial layout generator module 64 generates each candidate tree structure by adding one graphic object to the current tree structure at a time.

Thus, the tree structure generation process begins with a single graphic object, and additional graphic objects are added to the tree structure one at a time until all of the graphic objects that are assigned to the page have been added. If the total number of graphic objects assigned to a page is M, the layout for the page corresponds to the last in an increasing sequence of binary trees:

$$T(1), T(2), \ldots, T(M) \tag{27}$$

where T(p) for p≧1 denotes a tree with p terminal nodes. Each of the intermediate trees {T{p}: 1≦p≦N−1} generates a viable layout.

Figure 13A:
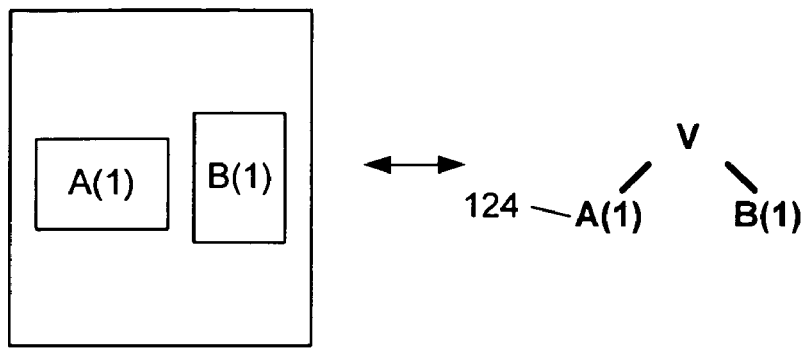
FIGS. 13A-13C are diagrammatic views of different partitions of a page and corresponding hierarchical tree structures.
Figure 13B:
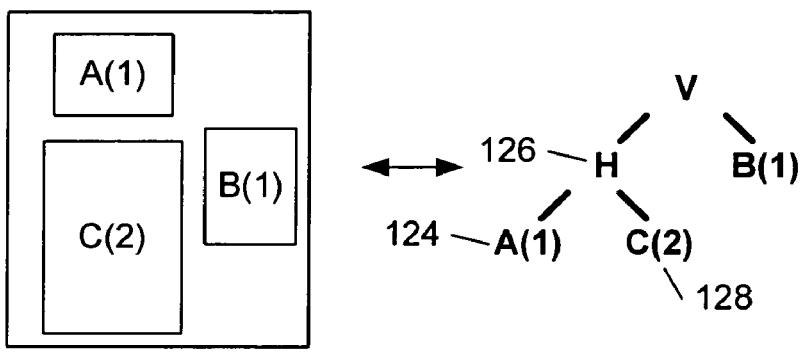
Figure 13C:
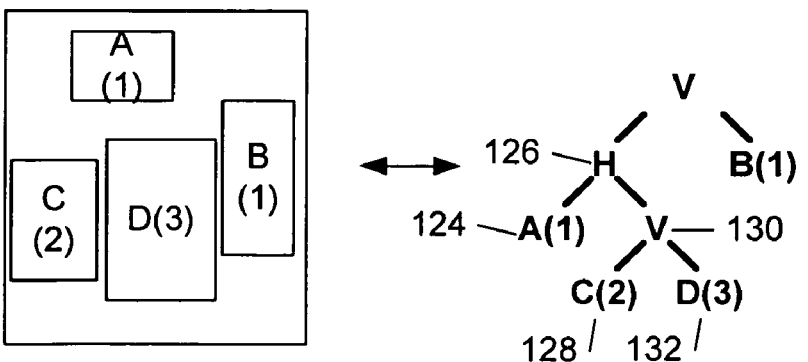

FIGS. 13A-13C show different partitions of a page and corresponding hierarchical tree structures at different stages of the tree structure generation process, where the numbers in parentheses are the relative areas assigned to the corresponding graphic objects A, B, C, D. Each node in the tree structure is associated with a bounding box in the layout of a page. Each interior node is associated with a bounding box around the boxes of its two child nodes, and each leaf node is associated with a cell where a respective graphic object is to be placed.

Each new graphic object is added to the tree structure by introducing a new cell to the previous layout. Thus, graphic object C is added to the sub-tree structure 124 shown in FIG. 13A by displacing the sub-tree structure 124 with a new interior H node 126 shown in FIG. 13B. The new interior H node 126 becomes the parent of a new leaf node 128 corresponding to the new cell C(2) and the sub-tree 124 that was displaced. Similarly, the graphic object D is added to the sub-tree structure 128 shown in FIG. 13B by displacing the sub-tree structure 128 with a new internal V node 130 shown in FIG. 13C. The new internal V node 130 becomes the parent of a new leaf node 132 corresponding to the new cell D(3) and the sub-tree 128 that was displaced. In the example illustrated in FIGS. 13A-13C, the selected sub-trees 124 and 128 that are displaced happened to be leaf nodes; in general, however, any sub-trees could have been selected, including sub-trees that are rooted at interior nodes. A sub-tree is defined as a node, designated as the sub-tree root, taken together with all the nodes that emanate from it. If the sub-tree root is an interior node, then the sub-tree includes both interior nodes and the terminal nodes that are its children.

As explained in detail below, the layout generator module 64 selects which cell is introduced into a previous layout by evaluating a collection of candidate relative layouts corresponding to all possible presentations of the new graphic object in each of the available new cell locations. Before each of the candidate relative layouts is evaluated, however, the coarse graphic object tree structures corresponding to the candidate relative layouts of multi-element graphic objects are expanded (or translated) into refined (or complete) tree structures whose leaves correspond to the individual constituent graphic objects of the graphic objects.

Figure 14A:
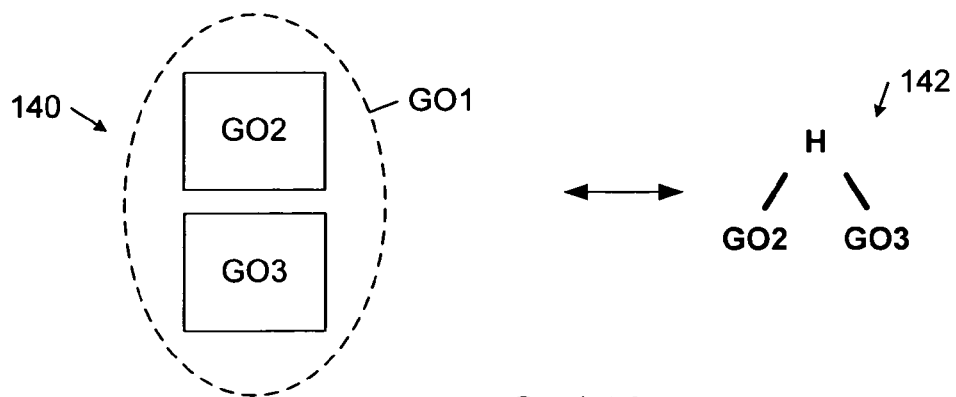
FIG. 14A is a diagrammatic view of a presentation of a first graphic object and a tree structure describing the presentation.
Figure 14B:
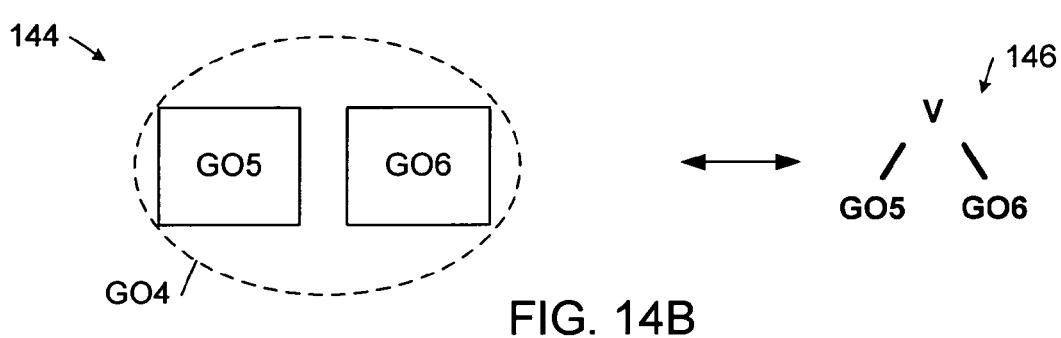
FIG. 14B is a diagrammatic view of a presentation of a second graphic object and a tree structure describing the presentation.
Figure 14C:
FIG. 14C is a diagrammatic view of a coarse tree structure containing leaf nodes corresponding to the first and second graphic objects shown in FIGS. 14A and 14B and a corresponding refined tree structure derived from the coarse tree structure.
Figure 14D:
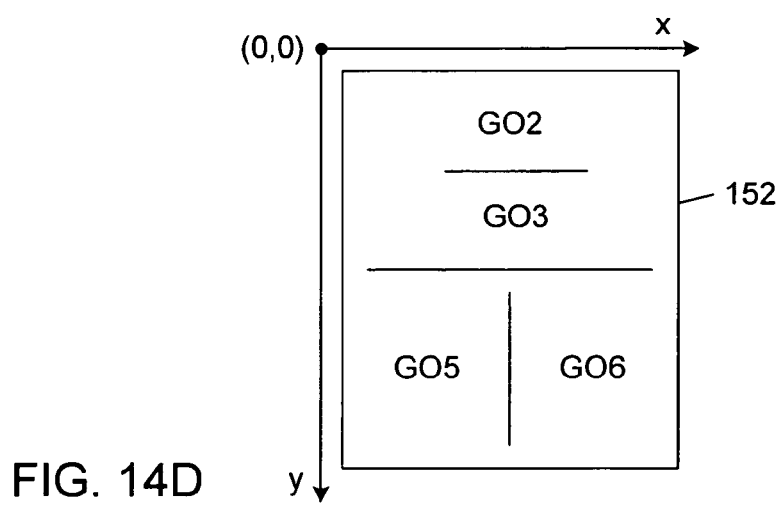
FIG. 14D is a relative layout of graphic objects on a page corresponding to the coarse and refined tree structures shown in FIG. 14C.

In one exemplary illustration, FIG. 14A shows one presentation of a graphic object 140 (GO1) and its corresponding tree structure 142. FIG. 14B shows one presentation of a graphic object 144 (GO4) and its corresponding tree structure 146. FIG. 14C shows a coarse tree structure 148 that consists of a horizontal root node and two terminal nodes corresponding to the graphic object presentations 140, 144 shown in FIGS. 13A and 13B. The coarse tree structure 148 is expanded into a refined tree structure 150 by substituting the tree structures 142, 146 for the terminal nodes representing the graphic object presentations 140, 144, as shown in FIG. 14C. FIG. 14D shows the resulting candidate relative layout corresponding to the refined tree structure 150 in a page 152.

Referring back to FIG. 12 after the multi-element graphic objects in the current tree structure have been expanded, the initial layout generator module 64 obtains respective feasibility test results and scores based at least in part on the corresponding initial size dimensions for the candidate tree structures (FIG. 12, block 107). These scores and feasibility test results are obtained from the layout evaluation module 66. Any candidate tree structure deemed infeasible by the layout evaluation module 66 is eliminated from consideration.

The initial layout generator module 64 selects one of the candidate tree structures as the current tree structure based on the computed scores (FIG. 12, block 109).

The initial layout generator module 64 repeats the processes of generating (FIG. 12, block 103), obtaining (FIG. 12, block 107), and selecting (FIG. 12, block 109) until relative locations on the page are defined for all of the graphic objects in the set by respective nodes in the current tree structure (FIG. 12, block 111).

The process of FIG. 12 is repeated for each of the one or more pages on which the graphic objects 76 are to be laid out.

B. Exemplary Process of Generating an Initial Arrangement of Graphic Objects

Figure 15A:
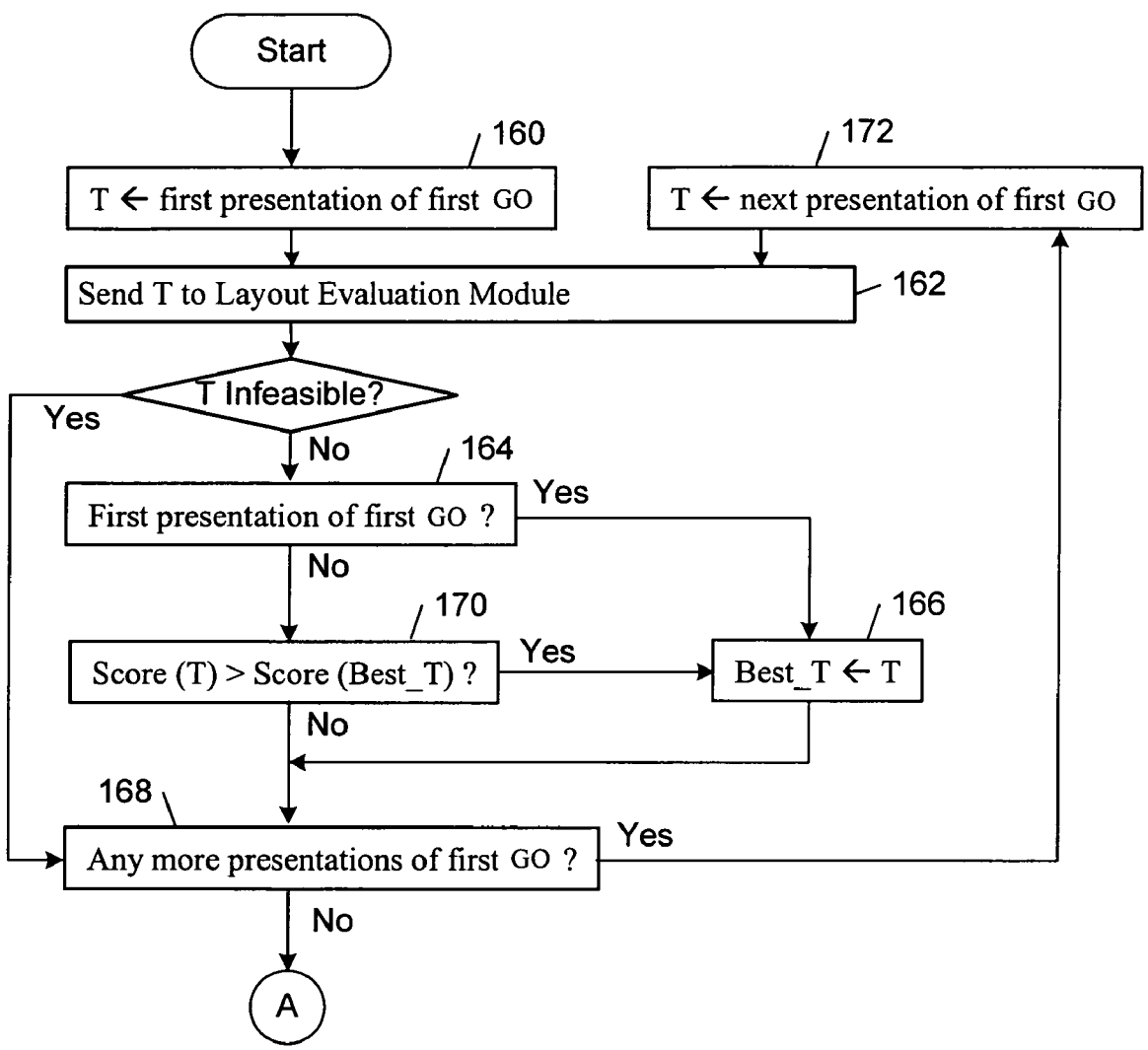
FIGS. 15A and 15B are respective flow diagrams of first and second portions of an embodiment of a method of generating a layout of graphic objects on a page.
Figure 15B:
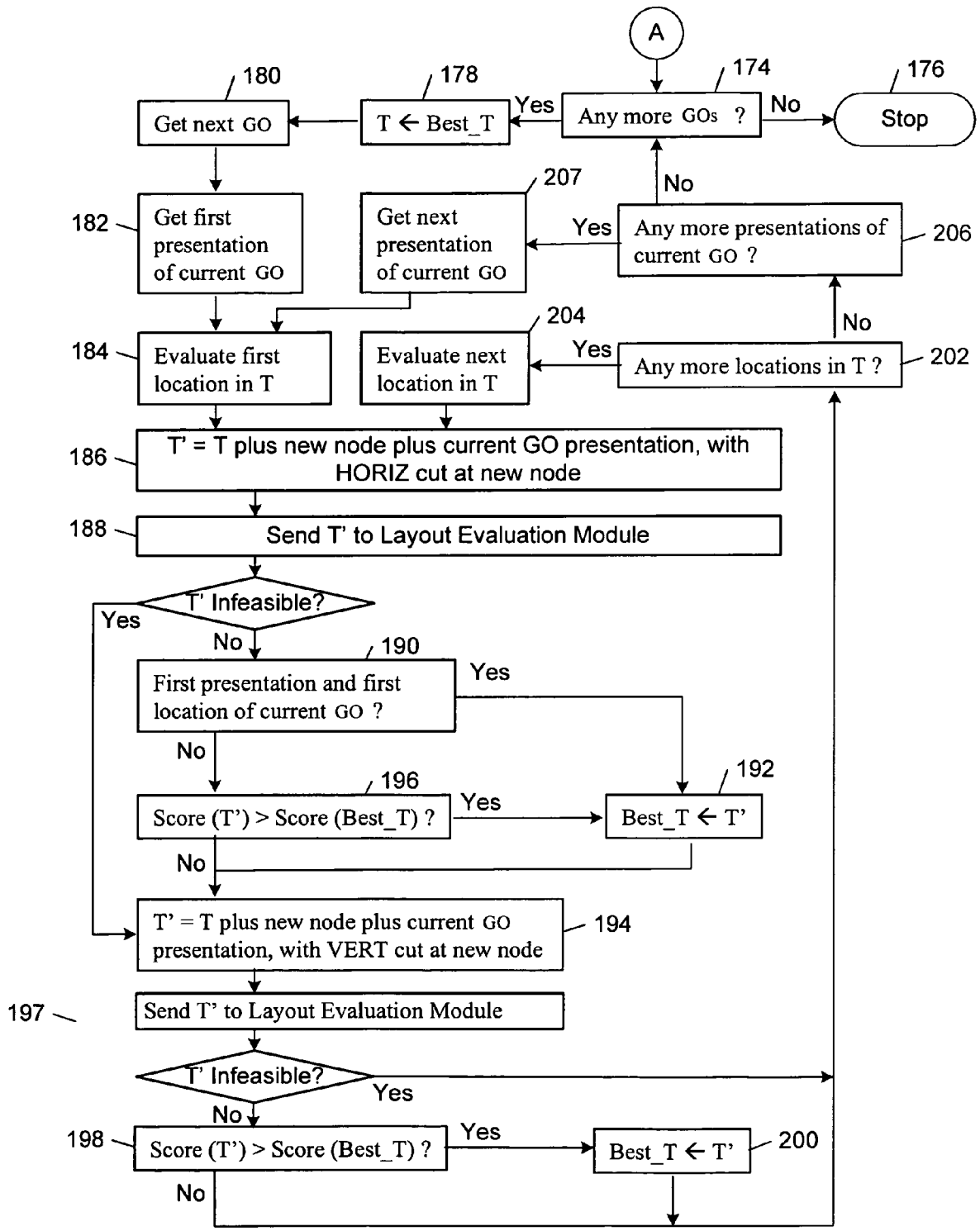

FIGS. 15A and 15B show an embodiment of an exemplary method by which the initial layout generator module 64 generates candidate relative layouts and selects one of the candidate relative layouts as the initial arrangement 80 of graphic objects on a page (see FIG. 4).

Block 160 initiates a current candidate layout T with a first presentation of the first graphic object (GO). Block 162 sends the current candidate layout T to the layout evaluation module 66 (see FIG. 4). As explained in detail above, the layout evaluation module 66 confirms the feasibility of the candidate relative layout, determines initial size dimensions for the graphic objects in the current candidate layout T, and computes a score Score(T) for the current candidate layout T based at least in part on the initial size dimensions.

If the layout evaluation module deems the candidate layout infeasible, the candidate layout is discarded and the process moves directly to block 168.

If the candidate layout is feasible, block 164 determines whether this is the first presentation of the first graphic object. If this is the first presentation of the first graphic object, block 166 designates tree T as the current best layout, Best_T, and proceeds to block 168. If this is not the first presentation of the first graphic object, block 170 compares Score(T) to a score, Score(Best_T), for the layout corresponding to the best tree where scoring may be performed in the manner described below. If Score(T) is greater than Score(Best_T), block 166 designates the current candidate layout T as the new Best_T, and proceeds to block 168. If Score(T) is not greater than Score(Best_T), the best current candidate layout designation is not changed, and the process proceeds to block 168.

Block 168 determines whether any additional presentations of the first graphic object are available. If more presentations of the first graphic object are available, block 172 retrieves the next presentation of the first graphic object to form a new current candidate layout T and the process is repeated for the new current candidate layout. If block 168 determines that there are no additional presentations of the first graphic object, the process proceeds to block 174 in FIG. 15B.

Block 174 determines whether there are any more graphic objects to be added to the current candidate layout. If there are no more graphic objects to be added to the current candidate layout, the current Best_T is selected as the final layout from the initial arrangement generation process and the process terminates at block 176.

If block 174 determines there are additional graphic objects to be added to the current candidate layout, then block 178 designates the current best layout, Best_T, as the new current candidate layout T. Block 180 retrieves the next current graphic object. Block 182 retrieves (or determines) the first presentation of the current graphic object. Block 184 selects a first location in the current candidate layout T at which to evaluate the current graphic object presentation. The location may be either an internal node or an external node (i.e., leaf) of the current candidate layout T. At block 186, an alternate candidate layout T' is created by adding a new node at the first location. One child of the new node is the subtree of the current candidate layout T whose root is the location in T. The other child of the new node is the current presentation of the current graphic object being added to the layout. In the alternate current candidate layout T', a horizontal division is assigned to the new node.

Block 188 sends the alternate candidate layout T' to the layout evaluation module 66. As explained in detail above, the layout evaluation module 66 confirms the feasibility of the candidate relative layout, determines initial size dimensions for the graphic objects in the alternate candidate layout T', and computes a score Score(T') for the alternate candidate layout T' based at least in part on the initial size dimensions.

If the layout evaluation module deems the candidate layout infeasible, the candidate layout is discarded and the process moves directly to block 194.

If the candidate layout is feasible, block 190 determines if this is the first location and first presentation of the current graphic object. If this is the first location and first presentation of the current graphic object, block 192 designates the alternate candidate layout T' as the best current layout, Best_T, and proceeds to block 194. If this is not the first location and first presentation of the current graphic object, block 196 compares Score(T') with a score, Score(Best_T), for the layout corresponding to the best current layout where scoring may be performed in the manner described below. If Score (T') is greater than Score(Best_T), (indicating the alternate candidate layout T' is better than the current candidate layout T), then block 192 designates T' as the best current layout, Best_T, and the process proceeds to block 194. If Score(T') is less than or equal to Score(Best_T), the best current layout designation is not changed and operation proceeds to the same block 194.

At block 194, another alternate current layout T' is created by adding a new node in the place of the current location. One child of the new node is the subtree of T whose root is the location of T. The other child of the new node is the current presentation of the graphic object currently being added to the layout. In the alternate current layout T' of block 194, a vertical division is assigned to the new node.

Block 197 sends the alternate candidate layout T' to the layout evaluation module 66. The layout evaluation module 66 confirms the feasibility of the candidate relative layout, determines initial size dimensions for the graphic objects in the alternate candidate layout T', and computes a score Score (T') for the alternate candidate layout T' based at least in part on the initial size dimensions.

If the layout evaluation module deems the candidate layout infeasible, the candidate layout is discarded and the process moves directly to block 202.

If the candidate layout is feasible, block 198 determines a score, Score(T'), for the layout corresponding to the alternate candidate current layout T' and compares Score(T') with Score(Best_T). Blocks 170, 196, 198 may use the same or different scoring methods. If the Score(T') is greater than Score(Best_T), block 200 designates alternate current layout T' as the best current layout, Best_T, and the process proceeds to block 202. If block 198 determines the score of T' is not greater than the score of Best_T, the process proceeds directly to block 202.

Block 202 determines whether there are any additional locations available in the current candidate layout T. If additional locations are available in current candidate layout T, block 204 selects a new location in the current candidate layout T at which to evaluate the current graphic object presentation. Blocks 186 through 202 are repeated using the same current graphic object presentation.

When block 202 determines that no additional locations are available in the candidate layout T, the process proceeds to block 206. Block 206 determines whether there are any additional presentations of the current graphic object to consider. If additional presentations of the graphic object are available, the process proceeds to block 207, which retrieves the next presentation of the current graphic object. Block 184 selects the first location in the current candidate layout T at which to evaluate the current graphic object presentation. Blocks 186-204 evaluate the next presentation of the current graphic object T in each available location in the current candidate layout T.

When block 206 determines that there are no more presentations of the current graphic object to consider, the process proceeds to block 174, which determines if there are any additional graphic objects to be added to the current candidate layout. When block 174 determines there are no more graphic objects to be added to the current candidate layout, the current Best_T is selected as the final determinate layout and the process terminates at block 176.

IV. Modifying the Initial Arrangement of Graphic Objects

A. Overview

Figure 16:
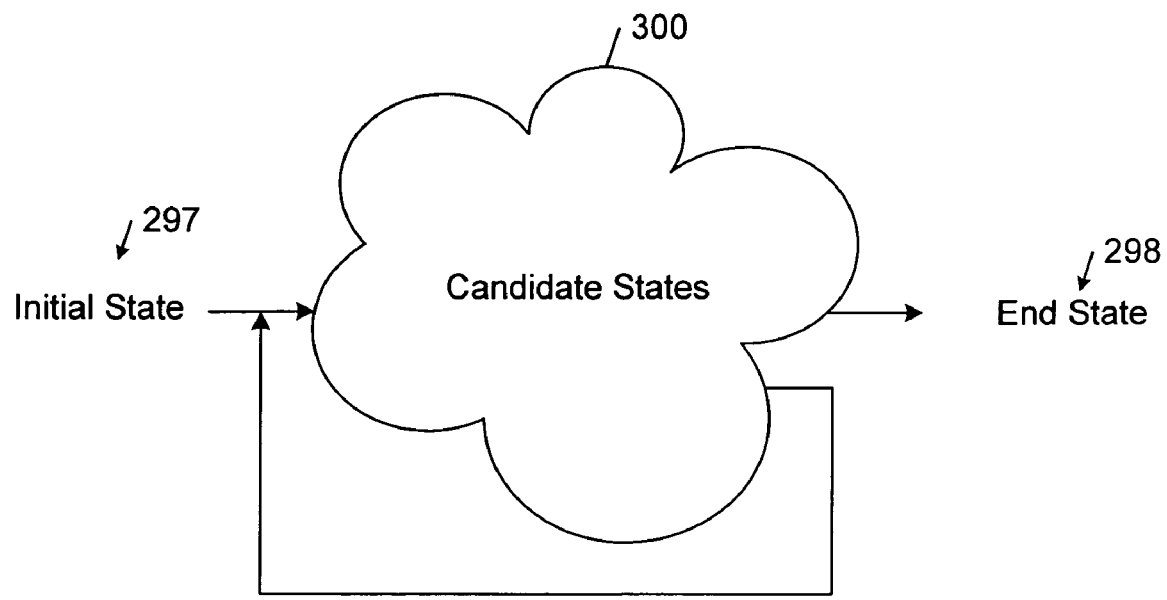
FIG. 16 is a diagrammatic view of an embodiment of a method of evolving one or more pages from an initial state to an end state by iteratively searching through a space of candidate states.

FIG. 16 diagrammatically shows an embodiment of a method by which the layout modification module 68 (FIG. 4) evolves the initial arrangements 80 of the graphic objects from an initial state 297, which has been generated by the initial layout generator module 64, to the end state 299 that has an improved image arrangement as determined by a heuristic measure for evaluating the layouts of images on the pages. In this method, the layout modification module 68 iteratively searches through a space 300 of candidate states. As explained in detail below, instead of exhaustively searching through all possible candidate states, the layout modification module 68 imposes a heuristic structure on the candidate state space 300 that allows these embodiments to quickly determine an improved arrangement of graphic objects on the one or more pages with a modest level of computing resources.

Figure 17:
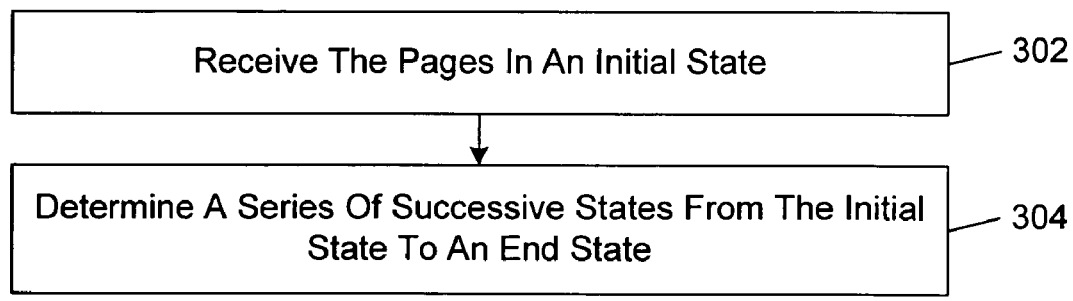
FIG. 17 is a flow diagram of an embodiment of a method of arranging graphic objects on pages.

FIG. 17 shows an embodiment of a method by which the layout modification module 68 enhances the initial arrangements 80 of the graphic objects on the pages. In accordance with this method, the layout modification module 68 receives the pages in the initial state (block 302). The layout modification module 68 determines a series of successive states from the initial state 297 to the end state 299 (block 304). During each of the layout state iterations, the layout modification module 68 determines a set of candidate successive states by making one or more changes to the arrangement of graphic objects corresponding to the current state. The number of candidate states and, consequently, the amount of computing resources needed to complete the search for the end state 299, is controlled at least in part by limiting the number and the type of changes that can be made to the current state to generate the current set of candidate successive states for the current search iteration.

Figure 18:
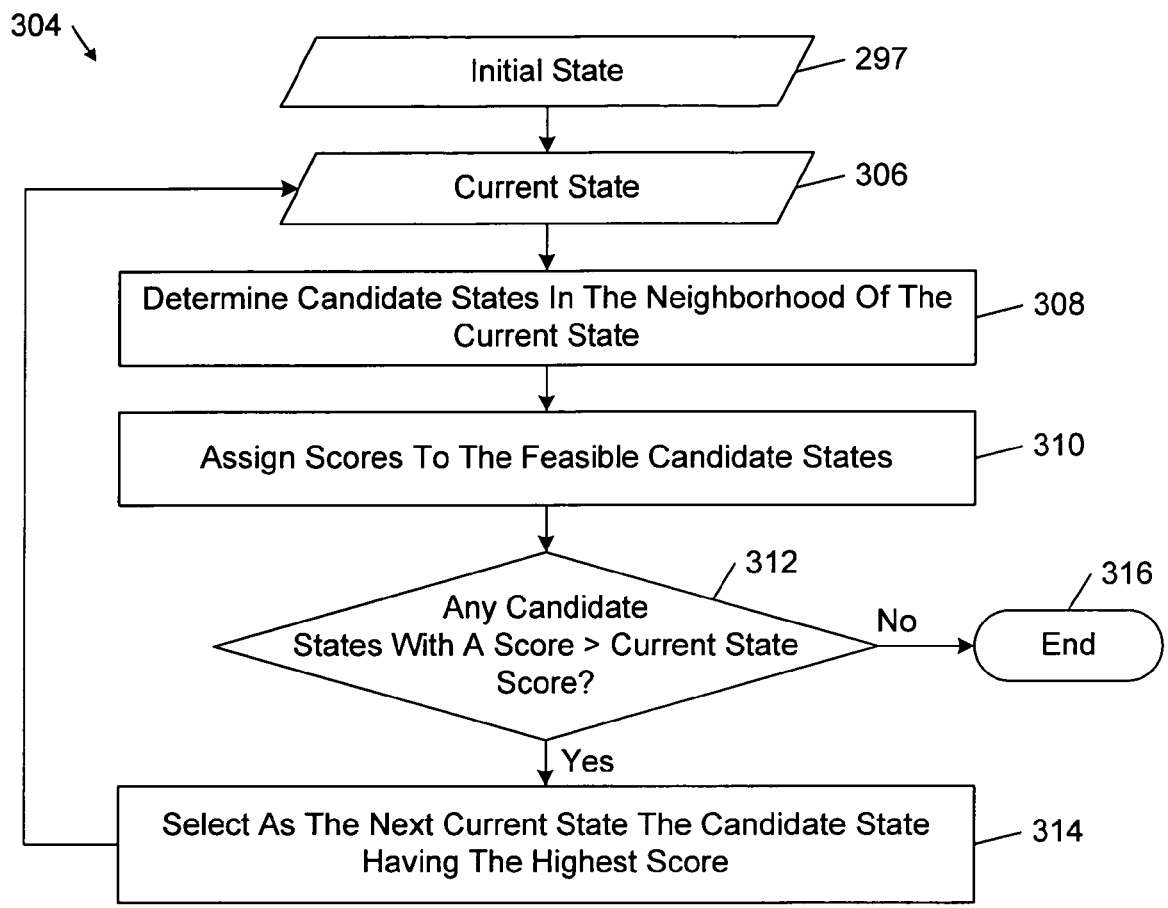
FIG. 18 is a flow diagram of an embodiment of a method of determining a series of successive states from an initial state to an end state.

FIG. 18 shows an embodiment of the method 304 by which the layout modification module 68 iteratively determines a series of successive states from the initial layout state 297 to the end state 299. The method 304 begins with a current state 306 equal to the initial state 297 that is generated by the initial layout generator module 64.

The layout modification module 68 then determines a set of candidate states in the neighborhood of the current state 306 (block 308). In general, each of the candidate states in the neighborhood of the current state is generated by changing the arrangement of graphic objects in the current state 306. Instead of considering all possible changes to the current state 306, the layout modification module 68 changes the current state 306 based on a set of parameters that control the kinds of changes that can be made. Some parameters limit the number of graphic objects that can be moved during a particular change. For example, in the illustrated embodiments, each change can correspond to a move of a graphic object from a layout location of a page to another layout location of the same page or a different page, or to an exchange (or trade) of two graphic objects on the same page or on two different pages. Some other rules limit the number of possible pages that can be affected by a change. For example, in the illustrated embodiments, each of the graphic objects in the current state 306 can only be moved to a page within a specified number of pages (or image movement radius) of the original page on which the graphic object is laid out in the current state 306. The graphic object movement radius may be determined empirically or it may be specified by a user.

After the candidates states in the neighborhood of the current state 306 have been determined (block 308), the layout modification module 68 obtains from the layout evaluation module 66 feasibility test results and scores for each of the candidate states (block 310). As described above, infeasible candidate states are discarded and therefore will not be carried forward in this description. In general, any heuristic scoring function that provides a measure of the quality of all of the pages may be used to score the candidate states. In some embodiments, the scoring function is one of the above-described scoring functions that are used by the layout evaluation module 66 to compute layout scores summed over all of the pages. In these embodiments, the graphic object areas used to compute the scores are computed by either the bounding-box-based area determination method or the path-based area determination method or the linear-system based area determination method, depending on the desired accuracy and the available computing resources.

If there is any candidate state with a score that is greater than the score assigned to the current state 306 (block 312), the layout modification module 68 selects the candidate state having the highest score as the next current state (block 314). The layout modification module 68 then repeats another iteration of the search for the end state 299, with the selected candidate state as the current state 306.

If none of the candidate states has a score that is greater than the current state 306 (block 312), the method terminates (block 316). The current state 306 at the time the method terminates is the end state 299, which the layout modification module 68 passes to the final layout generator module 70.

During the iterations of the method 304 (FIG. 18), graphic objects are removed from, and added to, pages or page layouts when considering candidate layouts and executing selected changes. In the illustrated embodiments, any time a graphic object is added to a page, it is inserted into the layout tree structure in the manner described above in connection with the initial layout generator module 64. The location where the graphic object is inserted is selected from among all possible locations, as the location that yields the highest layout score.

In any instance where a graphic object is removed from a page, the tree structure is modified as follows. The parent of the leaf corresponding to the graphic object being removed is identified, and then the subtree whose root is the sibling of the leaf being removed is identified. Next the identified subtree is removed from the identified tree; the leaf being removed is deleted; and the parent is replaced with the root of the subtree. That is, the leaf is deleted, and the former sibling of the leaf takes the place of their parent.

In any instance where a graphic object is added to a tree structure or removed from a tree structure, a precise area for each graphic object is recomputed in accordance with a desired style (e.g., "brick" or "strict area" style).

B. Tracking Candidate Successive States with Entries in a Change Table

In some implementations, the layout modification module 68 maintains a change table during the execution of the method 304 (FIG. 18). In this description, a graphic object is denoted with the letter I. The variable P' is used to represent the page number of a page where a graphic object could be located, and in some cases P' will refer to a page where a graphic object is scheduled to be located. The variable P will refer to the page number of the page where a graphic object is located at the beginning of the current change iteration. In each change iteration, a graphic object is reassigned to a different location on the pages: that is, in each change a graphic object I is moved from page P to page P'. Pages P and P' could be the same page, or they could be different pages.

1. Defining a Change Table

The change table contains a list of all of the allowable changes that may be made to the current state to generate the set of candidate successive states in the neighborhood of the current state 306. In particular, based on the graphic object movement radius, the layout modification module 68 deduces for each graphic object I a list of the pages on which the graphic object could be laid out. The layout modification module 68 generates the set K of all possible pairs (I,P') where I is a unique identifier for a graphic object and P' is a page number of the page on which the image I could be laid out. In some implementations, the layout modification module 68 represents a move of graphic object I from its current page to page P' with the notation M(I,P'). Similarly, the layout modification module 68 represents a trade of graphic object I from its current page to page P' with the notation T(I,P'). Since it is possible to move or trade any graphic object to any of its allowable destination (or target) pages, the layout modification module 68 defines the complete set C of allowable changes as follows:

$$C=\{c(I,P') \text{ such that } c\in\{M,T\} \text{ and } (I,P')\in K\} \qquad (28)$$

In some implementations, the change table C is implemented by a ledger with one row for each change element c in C. During execution, the layout modification module 68 maintains in each row the net change in score of the pages that would result if the current state were changed in accordance with the change specified in the corresponding row.

2. Maintaining the Change Table While Arranging Graphic Objects on Pages

Figure 19:
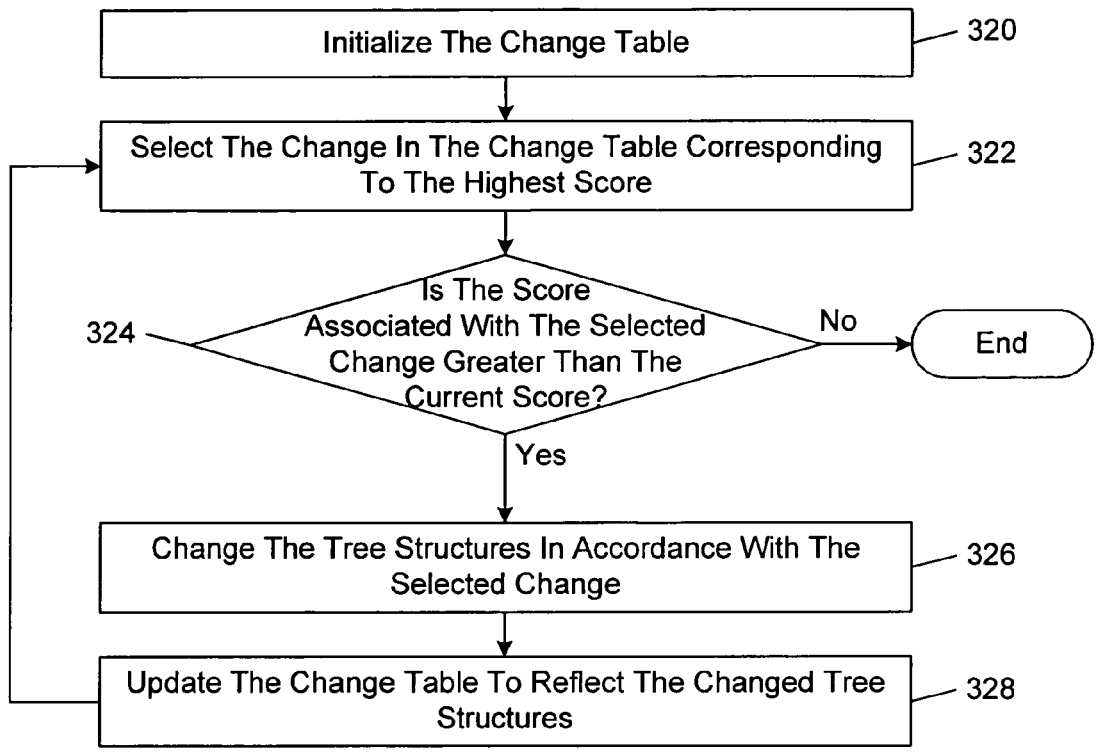
FIG. 19 is a flow diagram of an implementation of the graphic object arranging method of FIG. 17.

FIG. 19 shows a flow diagram of an implementation of the graphic object arranging method 304 (FIG. 18) in which the layout modification module 68 tracks candidate successive states with entries in a change table.

In accordance with this method, the layout modification module 68 begins by initializing the change table (block 320). In this process, the layout modification module 68 evaluates all the changes in C based on the initial state 297. In the illustrated embodiment, the way in which a change is evaluated depends on whether the change corresponds to a move or a trade, and whether the graphic object would be moved to a new page or remain on its current page. The process of evaluating changes is described in detail below.

Next, the layout modification module 68 selects the change c* in the change table that corresponds to the highest score (block 322). In this regard, the layout modification module 68 determines the row in the change table having the highest score increase value.

If the score associated with the selected change c* is greater than the score of the current state (block 324), the layout modification module 68 changes the tree structures representing the layouts of the graphic objects on the pages in accordance with the selected change c* (block 326).

For the purpose of the following discussion, the selected change c* is expanded as c*(I*,P*) where c* equals M or T, I* is the "primary" graphic object affected by the change (i.e., the image being moved or traded), and P* is the page where graphic object I* is to be moved. For completeness, P** is defined as the page where graphic object I* is in the current layout (i.e., before change c* is executed). Note that P* may, or may not, equal P**.

If the change c* that is selected in block 322 represents a move, one or more of the tree structures are modified in block 326 as follows:

1. graphic object I* is removed from its current page; and
2. graphic object I* is inserted into page P*

If P* equals P**, the graphic object is removed and then reinserted into the same page, but at a different location.

If the change c* that is selected in block 322 represents a trade, the change table entry for c* also contains the index I** identifying the "exchange graphic object" of the trade. The overall effect of the trade is to move the primary graphic object I* to page P* and the exchange graphic object I to page P. In this case, the tree structures representing the layouts on pages P* and P** are modified in block 326 as follows:

1. primary graphic object I* is removed from page P and exchange graphic object I** is removed from page P*; and
2. primary graphic object I* is added to page P* and exchange graphic object I is added to page P

In this process, the order in which the graphic objects are removed in step 1 does not matter. If P* does not equal P**, then the order in which graphic objects are added in step 2 also does not matter. If P* equals P**, however, the order in which the two graphic objects are added back to the layout does matter. In this case, the change table entry c* should further indicate which graphic object (I* or I**) is to be added to the page P* first.

As shown in FIG. 19, after the tree structures have been changed in accordance with the selected change c* (block 326), the change table is updated to reflect the changed tree structures (block 328). In particular, for each change book entry c(I,P') we consider P', and the page P that graphic object I was on before execution of block 326. If either page was affected when block 326 was executed (that is, if either P or P' was changed in step 326), then the change book entry is reevaluated as described below.

3. Evaluating Potential Changes to a Current State

In some implementations, the information that is computed in the process of evaluating the possible changes to a current state is stored in the change table. For example, in some of these implementations, whether a change is allowed and the exact specification of the change (e.g., the graphic object(s) involved, and the location(s) where they are moved) is stored in the change table.

As explained above, the process of initializing the change table (block 320; FIG. 19) involves evaluating all the changes in C based on the initial state 297. Also as explained above, the process of updating the change table after a change has been executed (FIG. 19, block 328) involves evaluating changes in C that are affected by the change just executed. In the illustrated embodiment, the way in which a change is evaluated depends on whether the change corresponds to a move or a trade, and whether the graphic object would be moved to a new page or remain on its current page. In the following description, it is assumed that in the current layout (that is, the initial state immediately before execution of block 320 in FIG. 19, or the changed state immediately after execution of block 326 in FIG. 19) graphic object I is positioned on page P. As stated earlier, the proposition of any change involves moving a graphic object I from page P to page P', where P may equal P', and where I may not be the only graphic object being moved.

a. Verifying Whether a Change is Allowed

The initial step in each of the following change evaluation methods is to verify whether the corresponding change is allowed. One purpose for this verification is to avoid evaluating changes that would not have any effect (e.g., moving a graphic object to the same page, when it is the only graphic object on the page). Another purpose is to make sure the change would not cause any page to have an unacceptable number of graphic objects. If the decision is made that a change is not allowed, then a flag is set in the change table indicating that the change is not allowed, and the evaluation is terminated. Effectively, the change is disqualified at least for the next change, and its status as "disqualified" may be removed only if the change is evaluated again in a future execution of block 328 of FIG. 19).

In some implementations, among the parameters that control whether a change may be allowed are integer values MIN_IPP and MAX_IPP, which represent the minimum and maximum numbers of graphic objects that are allowed to appear on any given page. These parameters obey the following relationship:

$$1 \leq MIN\_IPP \leq MAX\_IPP \tag{29}$$

The values of MIN_IPP and MAX_IPP may be inputs to the graphic object arranging system 60. Alternatively, in some embodiments, the graphic object arranging system 60 scans through the initial tree structures to empirically determine the true minimum and maximum numbers of graphic objects on the pages. The graphic object arranging system 60 increases the range of the allowable numbers of graphic objects per page based on these empirically determined values. This is achieved by subtracting from MIN_IPP and/or adding to MAX_IPP, subject to the relationship in expression (29). In any case, it is assumed that the tree structures representing the layouts of the pages in accordance with the initial arrangements 80 are in accordance with these parameter values (i.e., for any initial tree structure, the number of leaves is between MIN_IPP and MAX_IPP inclusive).

b. Evaluating a Move of a Graphic Object to a Location on the Same Page

Figure 20:
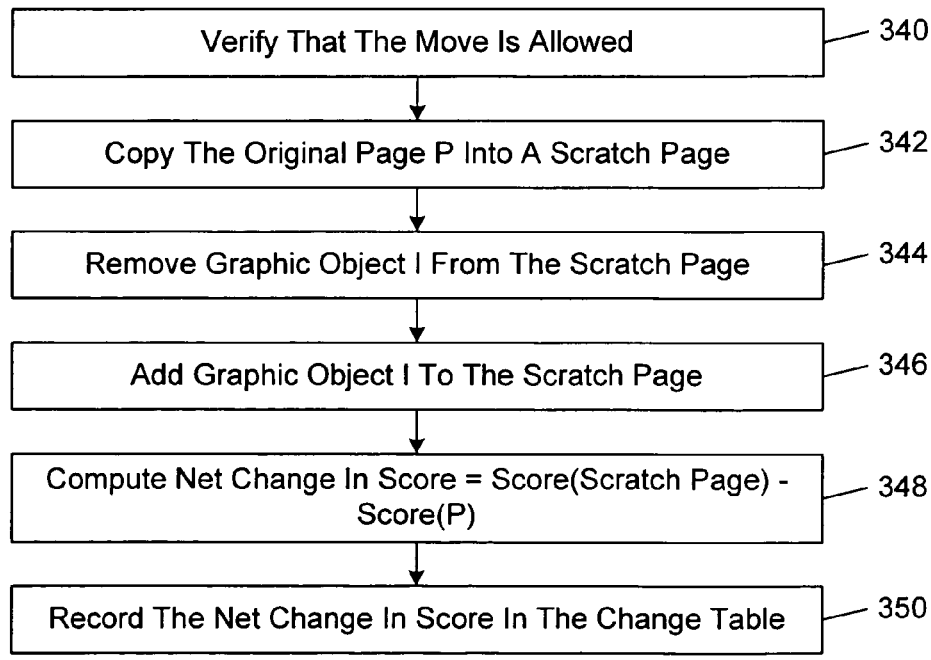
FIG. 20 is a flow diagram of an embodiment of a method of evaluating a move of a graphic object from a layout location on a page to another layout location on the same page.

FIG. 20 is a flow diagram of an embodiment of a method of evaluating a move of a graphic object from a layout location on a page to another layout location on the same page.

In accordance with this evaluation method, the layout modification module 68 initially verifies whether the move is allowed (block 340). If the change is a move and P equals P', the change is not allowed if the following is true, since this implies there is nowhere to move the graphic object: the number of graphic objects on P' is one.

If the move is allowed (block 340), the original page P is copied into a scratch page (block 342). Graphic object I is removed from the scratch page in accordance with the above-described process for removing graphic objects from pages (block 344). Graphic object I then is added back into the scratch page in accordance with the above-described process for adding graphic objects into pages (block 346).

The layout modification module 68 computes the net change in score for the move by subtracting the score of the original page from the score of the scratch page. The layout modification module 68 records the net change in score in the change table (block 350).

c. Evaluating a Move of a Graphic Object to a Location on a Different Page

Figure 21:
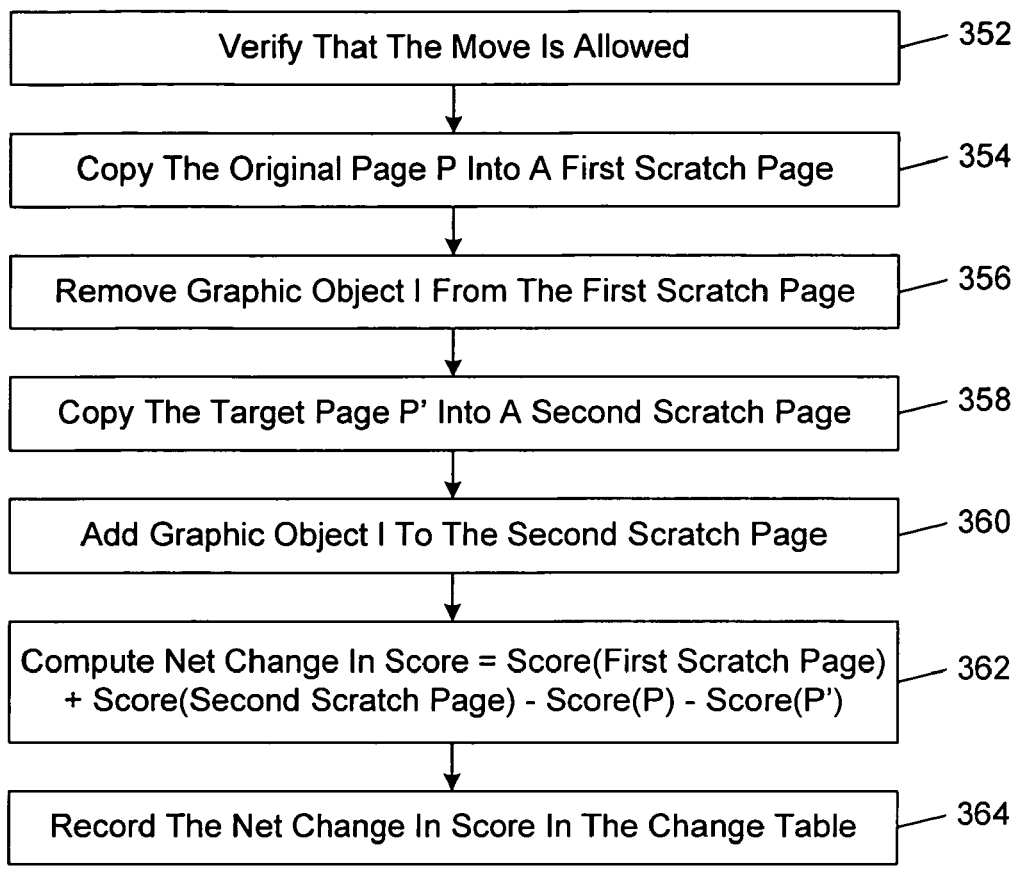
FIG. 21 is a flow diagram of an embodiment of a method evaluating a move of graphic object from a layout location of a page to another layout location on a different page.

FIG. 21 is a flow diagram of an embodiment of a method of evaluating a move of a graphic object from a layout location of a page P to another layout location on a different page P', where P does not equal P'.

In accordance with this evaluation method, the layout modification module 68 initially verifies whether the move is allowed (block 352). For the case where the change is a move and P does not equal P', the change is not allowed if one of the following is true, since it would result in an "illegal" layout:
1. the number of graphic objects on P is less than or equal to MIN_IPP; or
2. the number of graphic objects on P' is greater than or equal to MAX_IPP.

If the move is allowed (block 352), the original page P is copied into a first scratch page (block 354). Graphic object I is removed from the first scratch page in accordance with the above-described process for removing graphic objects from pages (block 356). The target page P' is copied into a second scratch page (block 358). Graphic object I is added to the second scratch page in accordance with the above-described process for adding graphic objects to pages (block 360).

The layout modification module 68 computes the net change in score for the move by subtracting the scores of the original and target pages P, P' from the sum of the scores of the first and second scratch pages (block 362). The layout modification module 68 records the net change in score in the change table (block 364).

d. Evaluating a Trade of Graphic Objects

Figure 22:
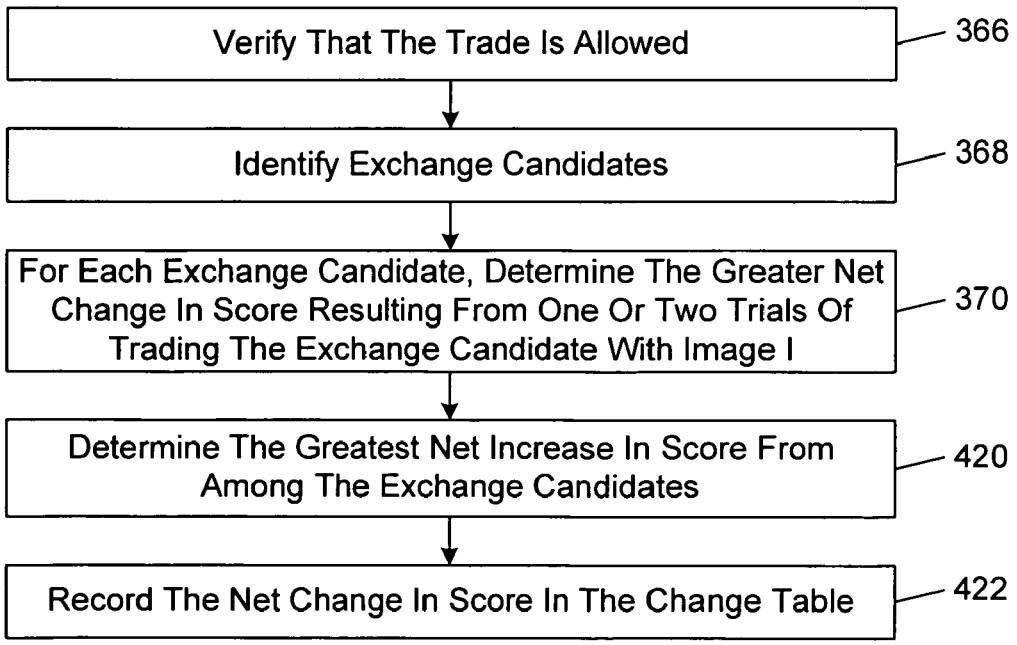
FIG. 22 is a flow diagram of an embodiment of a method of evaluating a change of the layout locations of two graphic objects on one or more pages.

FIG. 22 is a flow diagram of an embodiment of a method of evaluating a trade of two graphic objects. In this description, the proposed change would move the source graphic object I to the target page P', and the proposed change would move an exchange graphic object from the target page P' to the original page P.

In accordance with this evaluation method, the layout modification module 68 initially verifies whether the trade is allowed (block 366). If the change is a trade and P equals P', the change is not allowed if the following is true, since two graphic objects are needed for the trade: the number of graphic objects on P' is one. When the change is a trade and P does not equal P', the change is not allowed if and only if the following is true: there is no graphic object on target page P' that is allowed to be moved to source page P.

If the trade is allowed (block 366), the layout modification module 68 identifies a list of exchange candidates, which may also be called exchange graphic objects (block 368). If the change is a trade and P equals P', the list of exchange candidates is the list of graphic objects other than graphic object I that are on P. When the change is a trade and P does not equal P', the list of exchange candidates is the list of graphic objects on P' that are allowed to be on P.

For each of the exchange candidates identified in block 368, the layout modification module 68 determines the greater net change in score resulting from one or two trials of trading the exchange candidate with graphic object I (block 370). This process depends on whether or not P equals P'.

Figure 23:
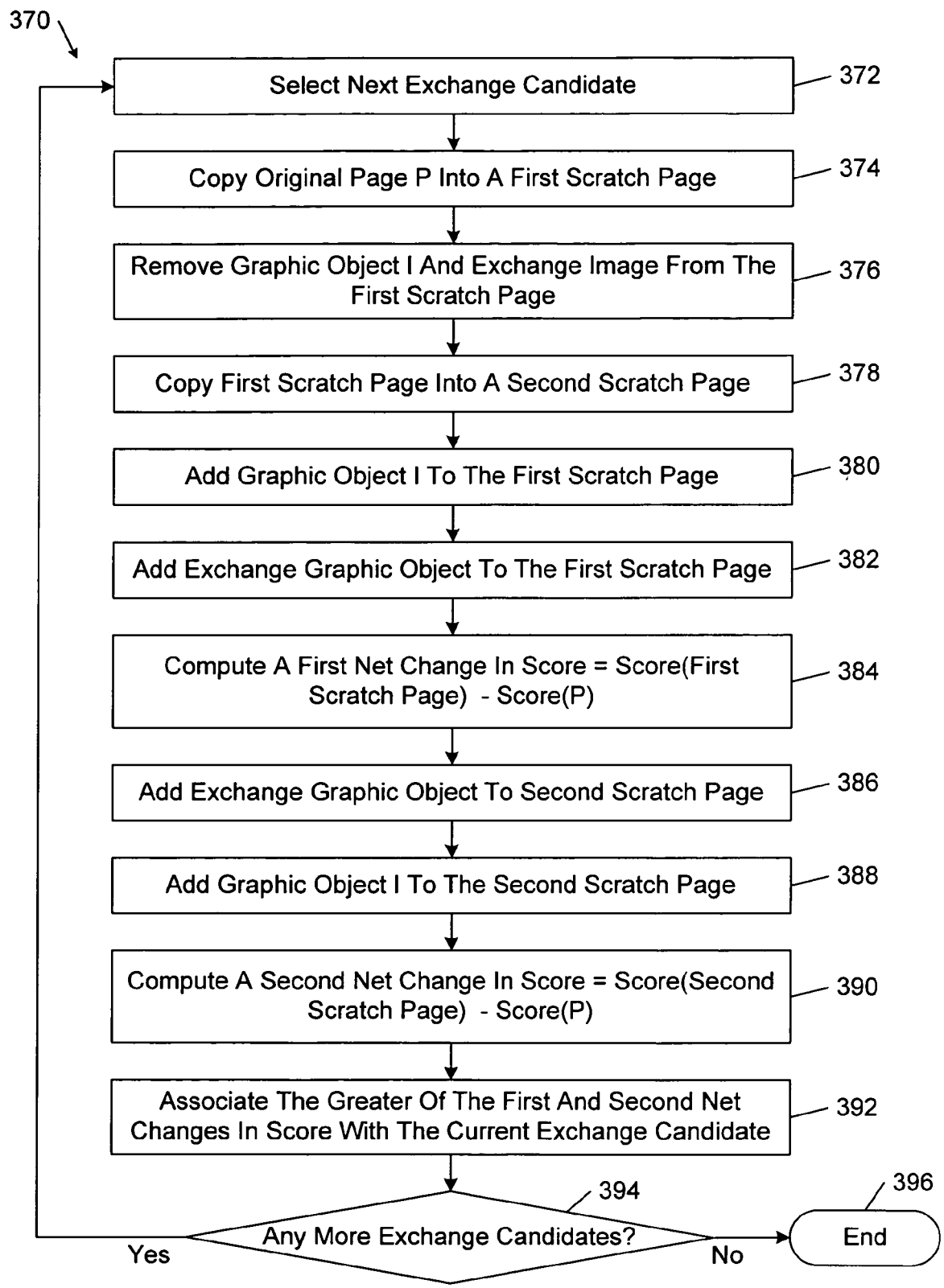
FIG. 23 is a flow diagram of an embodiment of a method of determining the greater net change in score resulting from trading an exchange candidate graphic object on a page with a given graphic object on the same page.

FIG. 23 shows the process of determining the greater net change in score for the case when P equals P'. In this process, the layout modification module 68 selects the next exchange candidate (block 372). The original page P is copied into a first scratch page (block 374). The graphic object I and the exchange graphic object are removed from the first scratch page (block 376). The first scratch page is copied into a second scratch page (block 378). Graphic object I is added to the first scratch page (block 380). The exchange graphic object is added to the first scratch page (block 382). A first net change in score is computed by subtracting the score of the original page P from the score of the first scratch page (block 384). The exchange graphic object is added to the second scratch page (block 386). Graphic object I is added to the second scratch page (block 388). A second net change in score is computed by subtracting the score of the original page P from the score of the second scratch page (block 390). The layout modification module 68 then associates the greater of the first and second net changes in score with the current exchange candidate (block 392). The process is repeated for each of the identified exchange candidates (block 394) then the process is terminated (block 396).

Figure 24:
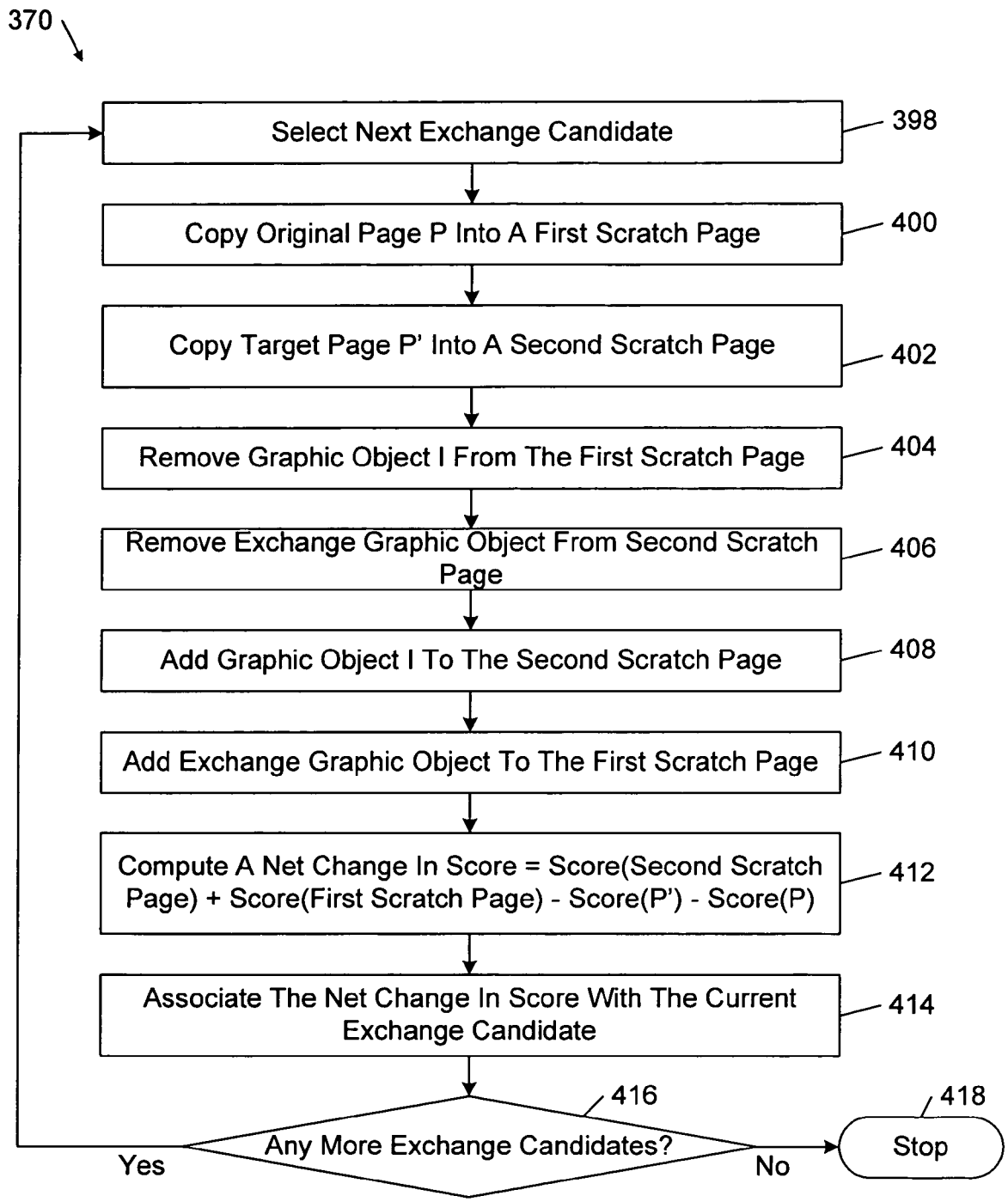
FIG. 24 is a flow diagram of an embodiment of a method of determining the greater net change in score resulting from trading an exchange candidate image on a page with a given image on a different page.

FIG. 24 shows the process of determining the greater net change in score for the case when P does not equal P'. In this process, the layout modification module 68 selects the next exchange candidate (block 398). The original page P is copied into a first scratch page (block 400). The target page P' is copied into a second scratch page (block 402). The graphic object I is removed from the first scratch page (block 404). The exchange graphic object is removed from the second scratch page (block 406). Graphic object I is added to the second scratch page (block 408). The exchange graphic object is added to the first scratch page (block 410). A net change in score is computed by subtracting the scores of the original page P and the target page P' from the sum of the scores of the first scratch page and the second scratch page (block 412). The layout modification module 68 then associates the computed net change in score with the current exchange candidate (block 414). The process is repeated for each of the identified exchange candidates (block 416) then the process is terminated (block 418).

Referring back to FIG. 21, after all the changes associated with the exchange candidates have been scored (block 370), the layout modification module 68 determines the greatest net increase in score from among the exchange candidates (block 420). The layout modification module 68 records the greatest net change in score in the change table (block 422).

V. Generating a Final Arrangement of Graphic Objects on a Page

As explained above, final layout generator module 70 receives tree structures representing page partitions from either the initial layout generator module 64 or the layout modification module 68, depending on whether or not the layout modification module 68 is included in the graphic object arrangement system 60. Each leaf node of a tree structure has an aspect ratio value (a) and, if a in the case of strict-area style layout, a relative area proportion value (e); and each interior node indicates either a horizontal or vertical division on the page. The final layout generator module 70 determines areas of the graphic objects on each page and then allocates a precise region of page space to each node. The allocated regions of the page are nested like the tree structure 80. The allocated regions are referred to herein as "cells". In some implementations, once a cell is known, the position of a graphic object assigned to the cell is determined by centering the graphic object in the cell.

A. Determining Graphic Object Areas

The areas of the graphic objects are determined by either the bounding-box-based area determination method or the path-based area determination method or the linear-system-based area determination method, depending on the desired accuracy, the desired layout style and the available computing resources. In some cases, the final layout generator module 70 may use the graphic object areas calculated by the layout evaluation module 66 for the immediately preceding upstream layout module using one of the graphic object area determination methods described above. In other cases, the final layout generator module 70 may direct the layout evaluation module 66 to compute the graphic object areas using a different one of the graphic object area determination methods described above.

B. Determining Bounding Boxes Around the Nodes in the Tree Structure

After absolute areas are computed, bounding boxes are characterized around each node in the tree structure. The actual steps required to accomplish this process are perfectly analogous to the process for computing bounding boxes described above in connection with bounding-box-based area determination, as show in FIG. 11, with two exceptions. First, the relative area proportions happen to be actual graphic object areas. Second, the spacing assigned to interior nodes is not ignored, but rather added to the sums in the computations of blocks 292 and 296.

C. Allocating Page Space to Graphic Objects

1. Overview of Page Space Allocation Process

In some embodiments, the process of allocating regions of page space to nodes involves dividing a page into cells and positioning each graphic object in its respective cell. The page is divided into cells by splitting the page into rectangles, starting with the entire usable area of the page as the first rectangle. Each split is accomplished by drawing a line segment for a respective one of the interior nodes, starting at the root node in order of a breadth-first search.

In the case of an interior node corresponding to a vertical division, the final layout generator module 70 selects a horizontal position x along the width of the available region. In one formulation, $x \in (0,1)$, where $x=0$ represents the leftmost position and $x=1$ represents the rightmost position in the available region. In this case, $$x = \frac{\sqrt{e_l/a_l}}{\sqrt{e_l/a_l} + \sqrt{e_r/a_r}} \quad (30)$$

where $a_l$, $e_l$, and $a_r$, $e_r$ are the aspect ratios and areas of the bounding boxes for the left and right children of the interior node. This formulation makes direct use of widths as proportions. The analogous formula for a horizontal division uses the heights. That is, if the vertical position along the height of the available space is denoted $y \in (0,1)$, where $y=0$ represents the bottom position and $y=1$ represents the top position:

$$x = \frac{\sqrt{e_b a_b}}{\sqrt{e_b a_b} + \sqrt{e_t a_t}} \quad (31)$$

where $a_b$, $e_b$, and $a_t$, $e_t$ are the aspect ratios and areas of the bounding boxes for the bottom and top children of the interior node.

The resulting layouts of the graphic objects on the pages define the final arrangement 90 of graphic objects shown in FIG. 4.

2. Detailed Process of Allocating Page Space to Graphic Objects

Figure 25:
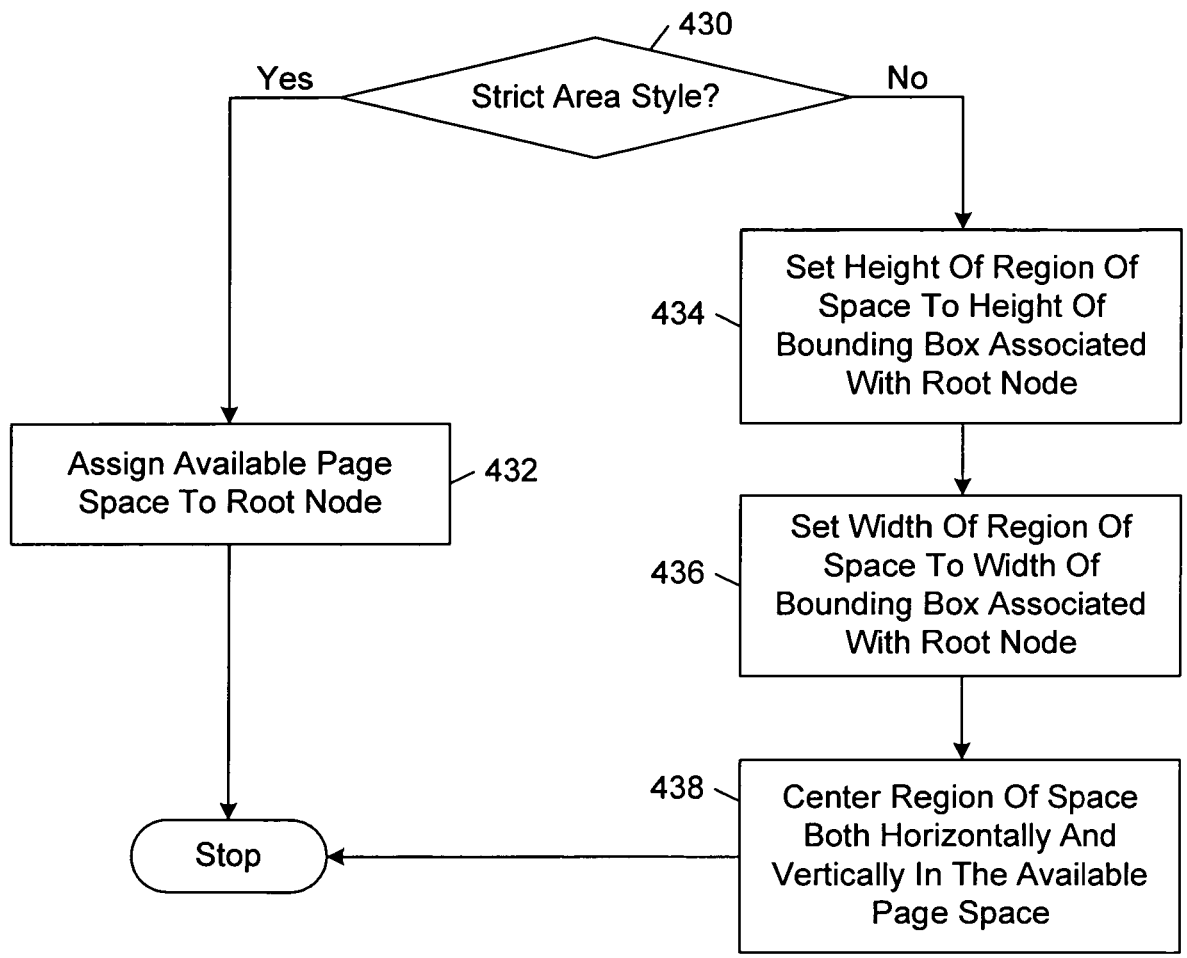
FIG. 25 is a flow diagram of an embodiment of a method of assigning a region of page space to a root node of a tree structure.

FIG. 25 shows an embodiment of a method of allocating a physical region of space on a page to the root node of the current tree structure. In accordance with this method, the layout style is determined (FIG. 25, block 430). For a strict area style layout, the entire usable area of the page is assigned to the root node (FIG. 25, block 432). For brick style layout, the page space assigned to the root node has the height and width of the bounding box associated with the root node (FIG. 25, blocks 434, 436). The region assigned to the root node then is centered in the available page space (FIG. 25, block 438).

Figure 26:
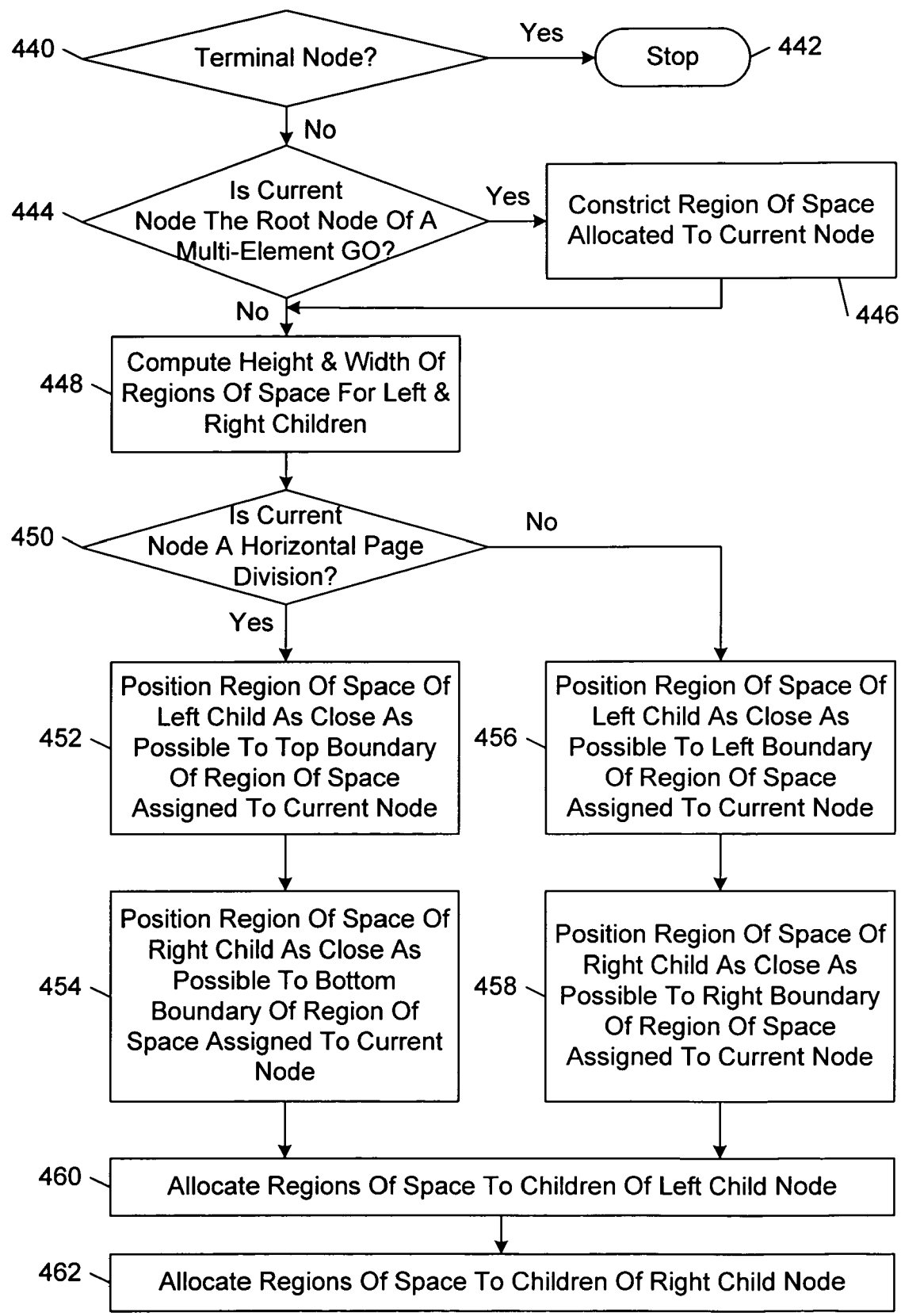
FIG. 26 is a flow diagram of an embodiment of a method of allocating regions of page space to children of a node of a tree structure.

FIG. 26 shows an embodiment of a method of allocating regions of page space to children of a node of a tree structure. In this process, the region of space assigned to each interior node is divided between its two direct children. The division is accomplished by setting the root node of the current tree structure to the current node and implementing a recursive process.

In the recursive process, a decision is made whether the current node is a terminal node (FIG. 26, block 440). If the current node is terminal node (i.e., a leaf node) the process ends (FIG. 26, block 442). If the current node is an interior node, a determination is made whether the current node is the root node of a tree corresponding to a multi-element graphic object (GO) having more than one single-element graphic object (FIG. 26, block 444). If this is the case, then the region assigned to the current node is constricted (FIG. 26, block 446) by reassigning the height and width of the region to be the height and width of the bounding box previously computed for the current node, and the position of the region is centered in the region previously assigned to the current node. In brick style layout this has no effect. In strict area style layout, this has the effect of pulling together the images in a graphic assembly having more than one graphic element (such as a series of keyframes).

If it is determined that the current node is not the root node of a tree corresponding to a multi-element graphic object (FIG. 26, block 444), the height and width of the regions of space for left children and right children of the current node are computed (FIG. 26, block 448).

If the current node is a horizontal page division, the heights ($H_R$, $H_L$ of the regions assigned to the right child and the left is given by:

$$H_R = R \cdot \frac{H_{NODE} - S}{L + R} \quad (32)$$

$$H_L = L \cdot \frac{H_{NODE} - S}{L + R} \quad (33)$$

where $H_{NODE}$ is the height of the current node region of space, S is the node spacing, L is the height of the left child node bounding box, and R is the height of the right child bounding box. The width of the regions assigned to the left and right children are set equal to the width of the region assigned to the current node.

If the current node is a vertical page division, the widths ($W_R$, $W_L$) of the regions assigned to the right child and the left is given by:

$$W_R = R \cdot \frac{W_{NODE} - S}{L + R} \quad (34)$$

$$W_L = L \cdot \frac{W_{NODE} - S}{L + R} \quad (35)$$

where $W_{NODE}$ is the width of the current node region of space. The height of the regions assigned to the left and right children are set equal to the height of the region assigned to the current node.

If the current node is a horizontal page division (FIG. 26, block 450), the region of space of the left child is positioned as close as possible to the top boundary of the region of space assigned to the current node (FIG. 26, block 452). The region of space of the right child is positioned as close as possible to the bottom boundary of the region of space assigned to the current node (FIG. 26, block 454).

If the current node is a vertical division (FIG. 26, block 450), the region of space of the left child is positioned as close as possible to the left boundary of the region of space assigned to the current node (FIG. 26, block 456). The region of space of the right child is positioned as close as possible to the right boundary of the region of space assigned to the current node (FIG. 26, block 458).

The process described above is repeated to allocate regions of space to children of the left child node (FIG. 26, block 460) and to children of the right child node (FIG. 26, block 462). The process is repeated iteratively until regions of page space are assigned to all children (direct or otherwise) of the current node.

VI. Conclusion

The embodiments that are described in detail herein provide ways to arrange graphic objects on one or more pages. These embodiments can create layouts of different types of graphic objects on a page to be created without using predefined templates, enabling the creation of new types of documents (e.g., photo/video albums with captions). These embodiments also enable graphic objects that are designated as being related to be kept together in page layouts, thereby preserving the context created by the physical proximity of such graphic objects.

Other embodiments are within the scope of the claims.

What is claimed is:

1. A method of arranging graphic objects on one or more pages, comprising:
    initiating a current tree structure comprising a first node defining a relative location on a selected one of the pages for a first graphic object selected from a set of graphic objects;
    generating candidate tree structures each comprising the current tree structure and a respective node defining a respective relative location on the selected page for another graphic object selected from the set;
    determining corresponding initial size dimensions for the graphic objects in each of the candidate tree structures;
    computing respective scores for the candidate tree structures based at least in part on the corresponding initial size dimensions;
    selecting one of the candidate tree structures as the current tree structure based on the computed scores;
    repeating the generating, the determining, the computing, and the selecting until relative locations on the page are defined for all of the graphic objects in the set by respective nodes in the current tree structure;
    after the repeating, calculating final size dimensions for the graphic objects in accordance with the current tree structure; and
    specifying respective positions of the graphic objects on the selected page in accordance with the current tree structure based at least in part on the calculated final size dimensions;
    wherein the initiating, the generating, the determining, the computing, the selecting, the repeating, the calculating, and the specifying are performed by a computer.

2. The method of claim 1, wherein each of the candidate tree structures has one or more interior nodes each corresponding to a respective division on the selected page and having one or more child nodes, and the determining comprises for each of the candidate tree structures determining relative size dimensions of bounding boxes for each interior node based on relative size dimensions of bounding boxes determined for its one or more child nodes.

3. The method of claim 2, wherein the computing comprises computing respective scores corresponding to respective measures of coverage of the selected page by the graphic objects with locations defined by the respective candidate tree structures based at least in part on the relative size dimensions determined for root nodes of the respective candidate tree structures and relative size dimensions associated with the graphic objects with locations defined by the respective candidate tree structures.

4. The method of claim 1, wherein the determining comprises identifying horizontal and vertical paths through each of the candidate tree structures.

5. The method of claim 4, wherein the determining additionally comprises computing a respective unit dimensional parameter for variable-area, ones of the graphic objects on each of the respective paths, each of the computed unit dimensional parameters maximizing coverage of the selected page by graphic objects on the corresponding path along a dimension of the selected page aligned with the corresponding path.

6. The method of claim 5, wherein the determining comprises identifying a minimal one of the computed unit dimensional parameters and computing the initial size dimensions based on the identified minimal unit dimensional parameter.

7. The method of claim 1, wherein the determining comprises for each of the candidate tree structures determining values of respective dimensional parameters for the graphic objects with locations defined by the candidate tree structure by solving a system of linear equations relating the dimensional parameters, and determining the initial size dimensions from the determined dimensional parameter values.

8. The method of claim 7, wherein one or more of the linear equations constrains paths of child nodes of common interior nodes of respective ones of the tree structures to have equal lengths.

9. The method of claim 1, wherein the current candidate tree structure has one or more interior nodes each corresponding to a respective division on the selected page and having one or more child nodes, and the calculating comprises determining relative size dimensions of bounding boxes for each interior node of the current tree structure based on relative size dimensions of bounding boxes determined for its one or more child nodes.

10. The method of claim 1, wherein the calculating comprises:
    identifying horizontal and vertical paths through the current tree structure; and
    computing a respective unit dimensional parameter for variable-area ones of the graphic objects on each of the respective paths, each of the computed unit dimensional parameters maximizing coverage of the selected page by graphic objects on the corresponding path along a dimension of the selected page aligned with the corresponding path.

11. The method of claim 10, wherein the calculating comprises identifying a minimal one of the computed unit dimensional parameters and computing the initial size dimensions based on the identified minimal unit dimensional parameter.

12. The method of claim 1, wherein the calculating comprises determining values of respective dimensional parameters for the graphic objects with locations defined by the current tree structure by solving a system of linear equations relating the dimensional parameters, and determining the initial size dimensions from the determined dimensional parameter values.

13. The method of claim 1, wherein after the repeating but before the calculating the current tree structure defines an initial arrangement of the graphic objects on the selected page, and further comprising:
    determining different candidate arrangements of the graphic objects in the set on one or more of the pages;
    evaluating the candidate arrangements; and
    selecting one of the initial arrangement and the candidate arrangements based on the evaluation.

14. The method of claim 13, further comprising iteratively repeating the determining different candidate arrangements, the evaluating, and the selecting with the respective arrangement selected in each iteration as the initial arrangement in each corresponding successive iteration.

15. The method of claim 13, wherein determining at least one of the candidate arrangements comprises changing locations of different respective ones of the graphic objects in the initial arrangement.

16. The method of claim 15, wherein the changing comprises moving a selected one of the graphic objects from a location on the selected page in accordance with the initial arrangement to a different location on the selected page.

17. The method of claim 16, wherein the moving comprises deleting the selected graphic object from the selected page and reintroducing the selected graphic object into the selected page based on an evaluation of multiple candidate layouts derived from a layout of the graphic objects on the selected page immediately after the deletion.

18. The method of claim 15, wherein the changing comprises changing an initial allocation of graphic objects among the pages.

19. The method of claim 18, wherein changing the initial allocation comprises moving one of the graphic objects from the selected page to another of the pages.

20. The method of claim 18, wherein changing the initial allocation comprises trading one of the graphic objects on the selected page with another one of the graphic objects on another one of the pages.

21. The method of claim 13, wherein the evaluating comprises determining initial size dimensions for the graphic objects in each of the candidate arrangements.

22. The method of claim 21, wherein each of the candidate arrangements is defined by a respective candidate arrangement tree structure that has one or more interior nodes each corresponding to a respective division on the selected page and having one or more child nodes, and the evaluating comprises for each of the candidate arrangement tree structures determining relative size dimensions of bounding boxes for each interior node based on relative size dimensions of bounding boxes determined for its one or more child nodes.

23. The method of claim 21, wherein the evaluating comprises:
identifying horizontal and vertical path through each of the candidate arrangement tree structures, and
computing a respective unit dimension parameter for variable-area ones of the graphic objects on each of the respective paths, each of the computed unit dimension parameters maximizing coverage of the selected page by graphic objects on the corresponding path along a dimension of the selected page aligned with the corresponding path.

24. The method of claim 21, wherein the evaluating comprises for each of the candidate arrangement tree structures determining values of respective dimensional parameters for the graphic objects with locations defined by the candidate arrangement tree structure by solving a system of linear equations relating the dimensional parameters, and determining the initial size dimensions from the determined dimensional parameter values.

25. A system for arranging graphic objects on one or more pages, the system comprising computer hardware configured to perform operations comprising:
initiating a current tree structure comprising a first node defining a relative location a selected one of the pages for a first graphic object selected from a set of graphic objects;
generating candidate tree structures each comprising the current tree structure and a respective node defining a respective relative location on the selected page for another graphic object selected from the set;
determining corresponding initial size dimensions for the graphic objects in each of the candidate tree structures;
computing respective scores for the candidate tree structures based at least in part on the corresponding initial size dimensions;
selecting one of the candidate tree structures as the current tree structure based on the computed scores;
repeating the generating, the determining, the computing, and the selecting until relative locations on the page are defined for all of the graphic objects in the set by respective nodes the current tree structure;
after the repeating, calculating final size dimensions for the graphic objects in accordance with the current tree structure; and
specifying respective positions of the graphic objects on the selected page in accordance with the current tree structure based at least in part on the calculated final size dimensions.

26. A machine-readable medium storing machine-readable instructions causing a machine to perform operations comprising:
initiating a current tree structure comprising a first node defining a relative location on a selected one of the pages for a first graphic object selected from a set of graphic objects;
generating candidate tree structures each comprising the current tree structure and a respective node defining a respective relative location on the selected page for another graphic object selected from the set;
determining corresponding initial size dimensions for the graphic objects in each of the candidate tree structures,
computing respective scores for the candidate tree structures based at least in part on the corresponding initial size dimensions;
selecting one of the candidate tree structures as the current tree structure based on the computed scores;
repeating the generating the determining the computing, and the selection until relative locations on the page are defined for all of the graphic objects in the set by respective nodes in the current tree structure;
after the repeating, calculating final size dimensions for the graphic objects in accordance with the current tree structure; and
specifying respective positions of the graphic objects on the selected page in accordance with the current tree structure based at least in part on the calculated final size dimensions.

* * * * *

UNITED STATES PATENT AND TRADEMARK OFFICE
CERTIFICATE OF CORRECTION

PATENT NO. : 7,640,516 B2  Page 1 of 1
APPLICATION NO. : 11/364933
DATED : December 29, 2009
INVENTOR(S) : C. Brian Atkins It is certified that error appears in the above-identified patent and that said Letters Patent is hereby corrected as shown below:

IN THE CLAIMS:

In column 32, line 1, in Claim 5, delete "area," and insert -- area --, therefor.

In column 33, line 39, in Claim 23, delete "path" and insert -- paths --, therefor.

In column 34, line 2, in Claim 25, after "location" insert -- on --.

In column 34, line 19, in Claim 25, after "nodes" insert -- in --.

In column 34, line 39, in Claim 26, delete "structures," and insert -- structures; --, therefor.

In column 34, line 46, in Claim 26, after "generating" insert -- , --.

In column 34, line 47, in Claim 26, delete "selection" and insert -- selecting --, therefor.

Signed and Sealed this

Thirty-first Day of August, 2010

David J. Kappos
*Director of the United States Patent and Trademark Office*